United States Patent
Habal et al.

(10) Patent No.: US 11,663,303 B2
(45) Date of Patent: May 30, 2023

(54) MULTICHANNEL THREAT DETECTION FOR PROTECTING AGAINST ACCOUNT COMPROMISE

(71) Applicant: Abnormal Security Corporation, San Francisco, CA (US)

(72) Inventors: Rami Faris Habal, San Francisco, CA (US); Abhijit Bagri, San Francisco, CA (US); Yea So Jung, San Mateo, CA (US); Fang Shuo Deng, San Francisco, CA (US); Jeremy Kao, San Francisco, CA (US); Jeshua Alexis Bratman, San Francisco, CA (US); Umut Gultepe, San Francisco, CA (US); Hariank Sagar Muthakana, San Francisco, CA (US)

(73) Assignee: Abnormal Security Corporation, San Francisco, CA (US)

( * ) Notice: Subject to any disclaimer, the term of this patent is extended or adjusted under 35 U.S.C. 154(b) by 0 days.

(21) Appl. No.: 17/861,192

(22) Filed: Jul. 9, 2022

(65) Prior Publication Data
US 2022/0342966 A1 Oct. 27, 2022

Related U.S. Application Data

(63) Continuation of application No. 17/190,105, filed on Mar. 2, 2021.
(Continued)

(51) Int. Cl.
G06F 21/31 (2013.01)
G06F 21/62 (2013.01)
(Continued)

(52) U.S. Cl.
CPC .......... *G06F 21/316* (2013.01); *G06F 21/552* (2013.01); *G06F 21/577* (2013.01); *G06F 21/6245* (2013.01)

(58) Field of Classification Search
CPC .... G06F 21/316; G06F 21/552; G06F 21/577; G06F 21/6245
(Continued)

(56) References Cited

U.S. PATENT DOCUMENTS 5,999,932 A 12/1999 Paul
6,023,723 A 2/2000 McCormick
(Continued)

FOREIGN PATENT DOCUMENTS

CN 107315954 11/2017

OTHER PUBLICATIONS

Barngrover, Adam, 'Vendor Access Management with IGA', Saviynt Inc. Apr. 24, 2019 (Apr. 24, 2019) Retrieved on Apr. 17, 2021 (Apr. 17, 2021) from <https://saviynt.com/vendor-access-management-with-iga/> entire document, 2 pp.
(Continued)

*Primary Examiner* — Jacob Lipman
(74) *Attorney, Agent, or Firm* — Van Pelt, Yi & James LLP

(57) ABSTRACT

Techniques for building, training, or otherwise developing models of the behavior of employees across more than one channel used for communication are disclosed. These models can be stored in profiles that are associated with the employees. Such profiles allow behavior to be monitored across multiple channels so that deviations can be detected and then examined. Remediation can be performed if an account is determined to be compromised based on its recent activity.

24 Claims, 19 Drawing Sheets

Related U.S. Application Data

(60) Provisional application No. 62/984,108, filed on Mar. 2, 2020.

(51) Int. Cl.
  *G06F 21/57* (2013.01)
  *G06F 21/55* (2013.01)

(58) Field of Classification Search
  USPC .......................................................... 726/25
  See application file for complete search history.

(56) References Cited

U.S. PATENT DOCUMENTS

| | | | |
|---|---|---|---|
| 6,088,717 A | 7/2000 | Reed | |
| 7,263,506 B2 | 8/2007 | Lee | |
| 7,451,487 B2 | 11/2008 | Oliver | |
| 7,610,344 B2 | 10/2009 | Mehr | |
| 7,953,814 B1 | 5/2011 | Chasin | |
| 8,112,484 B1 | 2/2012 | Sharma | |
| 8,244,532 B1 | 8/2012 | Begeja | |
| 8,566,938 B1 | 10/2013 | Prakash | |
| 8,819,819 B1 | 8/2014 | Johnston | |
| 8,935,788 B1 | 1/2015 | Diao | |
| 9,009,824 B1 | 4/2015 | Chen | |
| 9,154,514 B1 | 10/2015 | Prakash | |
| 9,213,827 B2 | 12/2015 | Li | |
| 9,245,115 B1 | 1/2016 | Jakobsson | |
| 9,245,225 B2 | 1/2016 | Winn | |
| 9,264,418 B1 | 2/2016 | Crosley | |
| 9,348,981 B1 | 5/2016 | Hearn | |
| 9,473,437 B1 | 10/2016 | Jakobsson | |
| 9,516,053 B1 | 12/2016 | Muddu | |
| 9,537,880 B1 | 1/2017 | Jones | |
| 9,571,512 B2 | 2/2017 | Ray | |
| 9,686,308 B1 | 6/2017 | Srivastava | |
| 9,756,007 B1 | 9/2017 | Stringhini | |
| 9,774,626 B1 | 9/2017 | Himler | |
| 9,781,152 B1 | 10/2017 | Mistratov | |
| 9,847,973 B1 | 12/2017 | Jakobsson | |
| 9,940,394 B1 | 4/2018 | Grant | |
| 9,946,789 B1 | 4/2018 | Li | |
| 9,954,805 B2 | 4/2018 | Nigam | |
| 9,961,096 B1 | 5/2018 | Pierce | |
| 9,967,268 B1 | 5/2018 | Hewitt | |
| 10,015,182 B1 | 7/2018 | Shintre | |
| 10,044,745 B1 | 8/2018 | Jones | |
| 10,091,312 B1 | 10/2018 | Khanwalkar | |
| 10,104,029 B1 | 10/2018 | Chambers | |
| 10,129,194 B1 | 11/2018 | Jakobsson | |
| 10,129,288 B1 | 11/2018 | Xie | |
| 10,243,989 B1 | 3/2019 | Ding | |
| 10,250,624 B2 | 4/2019 | Mixer | |
| 10,277,628 B1 | 4/2019 | Jakobsson | |
| 10,362,057 B1 | 7/2019 | Wu | |
| 10,397,272 B1 | 8/2019 | Bruss | |
| 10,419,468 B2 | 9/2019 | Glatfelter | |
| 10,523,609 B1 | 12/2019 | Subramanian | |
| 10,601,865 B1 | 3/2020 | Mesdaq | |
| 10,616,272 B2 | 4/2020 | Chambers | |
| 10,673,880 B1 | 6/2020 | Pratt | |
| 10,721,195 B2 | 7/2020 | Jakobsson | |
| 10,834,127 B1 | 11/2020 | Yeh | |
| 10,911,489 B1 | 2/2021 | Chechik | |
| 10,972,483 B2 | 4/2021 | Thomas | |
| 10,972,485 B2 | 4/2021 | Ladnai | |
| 11,019,076 B1 | 5/2021 | Jakobsson | |
| 11,494,421 B1 | 11/2022 | Ghafourifar | |
| 2002/0002520 A1 | 1/2002 | Gatto | |
| 2002/0116463 A1 | 8/2002 | Hart | |
| 2003/0204569 A1 | 10/2003 | Andrews | |
| 2004/0030913 A1 | 2/2004 | Liang | |
| 2004/0117450 A1 | 6/2004 | Campbell | |
| 2004/0128355 A1 | 7/2004 | Chao | |
| 2004/0215977 A1 | 10/2004 | Goodman | |
| 2004/0260922 A1 | 12/2004 | Goodman | |
| 2005/0039019 A1 | 2/2005 | Delany | |
| 2005/0187934 A1 | 8/2005 | Motsinger | |
| 2005/0198518 A1 | 9/2005 | Kogan | |
| 2006/0036698 A1 | 2/2006 | Hebert | |
| 2006/0053203 A1 | 3/2006 | Mijatovic | |
| 2006/0191012 A1 | 8/2006 | Banzhof | |
| 2006/0253581 A1 | 11/2006 | Dixon | |
| 2007/0074169 A1 | 3/2007 | Chess | |
| 2007/0276851 A1 | 11/2007 | Friedlander | |
| 2008/0005249 A1 | 1/2008 | Hart | |
| 2008/0086532 A1 | 4/2008 | Cunningham | |
| 2008/0114684 A1 | 5/2008 | Foster | |
| 2008/0201401 A1 | 8/2008 | Pugh | |
| 2009/0037350 A1 | 2/2009 | Rudat | |
| 2009/0132490 A1 | 5/2009 | Okraglik | |
| 2010/0115040 A1 | 5/2010 | Sargent | |
| 2010/0211641 A1 | 8/2010 | Yih | |
| 2010/0318614 A1 | 12/2010 | Sager | |
| 2011/0173142 A1 | 7/2011 | Dasgupta | |
| 2011/0179126 A1 | 7/2011 | Wetherell | |
| 2011/0213869 A1 | 9/2011 | Korsunsky | |
| 2011/0214157 A1 | 9/2011 | Korsunsky | |
| 2011/0231510 A1 | 9/2011 | Korsunsky | |
| 2011/0231564 A1 | 9/2011 | Korsunsky | |
| 2011/0238855 A1 | 9/2011 | Korsunsky | |
| 2011/0296003 A1* | 12/2011 | McCann | G06F 21/55 |
| | | | 709/224 |
| 2012/0028606 A1 | 2/2012 | Bobotek | |
| 2012/0110672 A1 | 5/2012 | Judge | |
| 2012/0137367 A1* | 5/2012 | Dupont | G06F 21/00 |
| | | | 726/25 |
| 2012/0233662 A1 | 9/2012 | Scott-Cowley | |
| 2012/0278887 A1 | 11/2012 | Vitaldevara | |
| 2012/0290712 A1 | 11/2012 | Walter | |
| 2012/0297484 A1 | 11/2012 | Srivastava | |
| 2013/0041955 A1 | 2/2013 | Chasin | |
| 2013/0086180 A1 | 4/2013 | Midgen | |
| 2013/0086261 A1 | 4/2013 | Lim | |
| 2013/0097709 A1 | 4/2013 | Basavapatna | |
| 2013/0167207 A1 | 6/2013 | Davis | |
| 2013/0191759 A1 | 7/2013 | Bhogal | |
| 2014/0013441 A1 | 1/2014 | Hencke | |
| 2014/0032589 A1 | 1/2014 | Styler | |
| 2014/0181223 A1 | 6/2014 | Homsany | |
| 2014/0325662 A1 | 10/2014 | Foster | |
| 2014/0365303 A1 | 12/2014 | Vaithilingam | |
| 2014/0379825 A1 | 12/2014 | Speier | |
| 2014/0380478 A1 | 12/2014 | Canning | |
| 2015/0026027 A1 | 1/2015 | Priess | |
| 2015/0128274 A1 | 5/2015 | Giokas | |
| 2015/0143456 A1 | 5/2015 | Raleigh | |
| 2015/0161609 A1 | 6/2015 | Christner | |
| 2015/0161611 A1 | 6/2015 | Duke | |
| 2015/0228004 A1 | 8/2015 | Bednarek | |
| 2015/0234831 A1 | 8/2015 | Prasanna Kumar | |
| 2015/0237068 A1 | 8/2015 | Sandke | |
| 2015/0295942 A1 | 10/2015 | Tao | |
| 2015/0295945 A1 | 10/2015 | Canzanese, Jr. | |
| 2015/0319157 A1 | 11/2015 | Sherman | |
| 2015/0339477 A1 | 11/2015 | Abrams | |
| 2016/0014151 A1 | 1/2016 | Prakash | |
| 2016/0036829 A1 | 2/2016 | Sadeh-Koniecpol | |
| 2016/0057167 A1 | 2/2016 | Bach | |
| 2016/0063277 A1* | 3/2016 | Vu | G06F 21/57 |
| | | | 726/4 |
| 2016/0156654 A1 | 6/2016 | Chasin | |
| 2016/0227367 A1 | 8/2016 | Alsehly | |
| 2016/0253598 A1 | 9/2016 | Yamada | |
| 2016/0262128 A1 | 9/2016 | Hailpern | |
| 2016/0301705 A1 | 10/2016 | Higbee | |
| 2016/0306812 A1 | 10/2016 | McHenry | |
| 2016/0321243 A1 | 11/2016 | Walia | |
| 2016/0328526 A1 | 11/2016 | Park | |
| 2016/0344770 A1 | 11/2016 | Verma | |
| 2016/0380936 A1 | 12/2016 | Gunasekara | |
| 2017/0041296 A1 | 2/2017 | Ford | |
| 2017/0048273 A1 | 2/2017 | Bach | |
| 2017/0098219 A1 | 4/2017 | Peram | |

(56) References Cited

U.S. PATENT DOCUMENTS

| | | |
|---|---|---|
| 2017/0111506 A1 | 4/2017 | Strong |
| 2017/0186112 A1 | 6/2017 | Polapala |
| 2017/0214701 A1 | 7/2017 | Hasan |
| 2017/0222960 A1 | 8/2017 | Agarwal |
| 2017/0223046 A1 | 8/2017 | Singh |
| 2017/0230323 A1 | 8/2017 | Jakobsson |
| 2017/0230403 A1 | 8/2017 | Kennedy |
| 2017/0237754 A1 | 8/2017 | Todorovic |
| 2017/0237776 A1 | 8/2017 | Higbee |
| 2017/0251006 A1 | 8/2017 | Larosa |
| 2017/0289191 A1 | 10/2017 | Thioux |
| 2017/0324767 A1 | 11/2017 | Srivastava |
| 2017/0346853 A1 | 11/2017 | Wyatt |
| 2018/0026926 A1 | 1/2018 | Nigam |
| 2018/0027006 A1 | 1/2018 | Zimmermann |
| 2018/0084003 A1 | 3/2018 | Uriel |
| 2018/0084013 A1 | 3/2018 | Dalton |
| 2018/0091453 A1 | 3/2018 | Jakobsson |
| 2018/0091476 A1 | 3/2018 | Jakobsson |
| 2018/0159808 A1 | 6/2018 | Pal |
| 2018/0189347 A1 | 7/2018 | Ghafourifar |
| 2018/0196942 A1 | 7/2018 | Kashyap |
| 2018/0219888 A1 | 8/2018 | Apostolopoulos |
| 2018/0227324 A1 | 8/2018 | Chambers |
| 2018/0288063 A1* | 10/2018 | Koottayi ............. H04L 63/1416 |
| 2018/0295146 A1 | 10/2018 | Kovega |
| 2018/0324297 A1 | 11/2018 | Kent |
| 2018/0330381 A1 | 11/2018 | Williams |
| 2018/0375814 A1 | 12/2018 | Hart |
| 2019/0014143 A1 | 1/2019 | Syme |
| 2019/0026461 A1 | 1/2019 | Cidon |
| 2019/0028509 A1* | 1/2019 | Cidon ................. H04L 63/1425 |
| 2019/0052655 A1 | 2/2019 | Benishti |
| 2019/0065748 A1 | 2/2019 | Foster |
| 2019/0068616 A1 | 2/2019 | Woods |
| 2019/0081983 A1 | 3/2019 | Teal |
| 2019/0087428 A1 | 3/2019 | Crudele |
| 2019/0089711 A1 | 3/2019 | Faulkner |
| 2019/0104154 A1 | 4/2019 | Kumar |
| 2019/0109863 A1 | 4/2019 | Traore |
| 2019/0141183 A1 | 5/2019 | Chandrasekaran |
| 2019/0166161 A1 | 5/2019 | Anand |
| 2019/0166162 A1 | 5/2019 | Anand |
| 2019/0190929 A1 | 6/2019 | Thomas |
| 2019/0190936 A1 | 6/2019 | Thomas |
| 2019/0199745 A1 | 6/2019 | Jakobsson |
| 2019/0205511 A1 | 7/2019 | Zhan |
| 2019/0222606 A1 | 7/2019 | Schweighauser |
| 2019/0238571 A1 | 8/2019 | Adir |
| 2019/0260780 A1 | 8/2019 | Dunn |
| 2019/0311121 A1 | 10/2019 | Martin |
| 2019/0319905 A1 | 10/2019 | Baggett |
| 2019/0319987 A1 | 10/2019 | Levy |
| 2019/0349400 A1 | 11/2019 | Bruss |
| 2019/0384911 A1 | 12/2019 | Caspi |
| 2020/0007502 A1 | 1/2020 | Everton |
| 2020/0021609 A1 | 1/2020 | Kuppanna |
| 2020/0044851 A1 | 2/2020 | Everson |
| 2020/0053111 A1 | 2/2020 | Jakobsson |
| 2020/0053120 A1 | 2/2020 | Wilcox |
| 2020/0068031 A1* | 2/2020 | Kursun ................. H04W 24/02 |
| 2020/0074078 A1 | 3/2020 | Saxe |
| 2020/0076825 A1 | 3/2020 | Vallur |
| 2020/0125725 A1 | 4/2020 | Petersen |
| 2020/0127962 A1 | 4/2020 | Chuhadar |
| 2020/0162483 A1 | 5/2020 | Farhady |
| 2020/0204572 A1 | 6/2020 | Jeyakumar |
| 2020/0287936 A1 | 9/2020 | Nguyen |
| 2020/0344251 A1 | 10/2020 | Jeyakumar |
| 2020/0358804 A1 | 11/2020 | Crabtree |
| 2020/0374251 A1 | 11/2020 | Warshaw |
| 2020/0389486 A1 | 12/2020 | Jeyakumar |
| 2020/0396190 A1 | 12/2020 | Pickman |
| 2020/0396258 A1 | 12/2020 | Jeyakumar |
| 2020/0412767 A1 | 12/2020 | Crabtree |
| 2021/0021612 A1 | 1/2021 | Higbee |
| 2021/0058395 A1 | 2/2021 | Jakobsson |
| 2021/0091962 A1 | 3/2021 | Finke |
| 2021/0092154 A1 | 3/2021 | Kumar |
| 2021/0168161 A1 | 6/2021 | Dunn |
| 2021/0240836 A1 | 8/2021 | Hazony |
| 2021/0272066 A1 | 9/2021 | Bratman |
| 2021/0295179 A1 | 9/2021 | Eyal Altman |
| 2021/0329035 A1 | 10/2021 | Jeyakumar |
| 2021/0336983 A1 | 10/2021 | Lee |
| 2021/0360027 A1 | 11/2021 | Boyer |
| 2021/0374679 A1 | 12/2021 | Bratman |
| 2021/0374680 A1 | 12/2021 | Bratman |
| 2022/0021700 A1 | 1/2022 | Devlin |

OTHER PUBLICATIONS

Information Security Media Group, 'Multi-Channel Fraud: A Defense Plan', Retrieved on Apr. 18, 2021 (Apr. 18, 2021) from <https://www.bankInfosecurity.com/Interviews/multi-channel-fraud-defense-plan-i-1799>, Feb. 20, 2013, 9 pages.

International Search Report and Written Opinion dated Apr. 24, 2020 of PCT/US2019/067279 (14 pages).

Mahajan, et al., 'Finding HTML Presentation Failures Using Image Comparison Techniques', ASE'14, pp. 91-98 (Year: 2014).

Mont, Marco Casassa, 'Towards accountable management of identity and privacy: Sticky policies and enforceable tracing services', 14th International Workshop on Database and Expert Systems Applications, 2003. Proceedings. IEEE, 2003. Mar. 19, 2003 (Mar. 19, 2003), Retrieved on Apr. 17, 2021 (Apr. 17, 2021) from <https://ieeexplore.ieee.org/abstract/documenV1232051> entire document, Mar. 19, 2003, 17 pp.

Proofpoint (Proofpoint Closed-Loop Email Analysis and Response, Aug. 2018, 2 pages) (Year: 2018).

* cited by examiner

1100

1101

Obtain (i) First Data Related to Communications Sent on a First Channel by a First Set of Accounts and (ii) Second Data Related to Communications Sent on a Second Channel by a Second Set of Accounts Associated with Employees of an Enterprise

1102

Determine, for Each Communication Sent on the First and Second Channels, a Likelihood that a Corresponding Account from Which that Communication Originates is Compromised

FIG. 11

| Abnormal Security | Dashboard | Threat Log | Abnormal Cases | Email Finder | ⊞ 👤 John Doe ⌄ |

Threat log

| 12342 | 9823 | 1492 | 1027 |
|---|---|---|---|
| Total Attacks Found by Abnormal Security | Outlook Email Attacks | Microsoft Team Messages | Slack Messages |

Breakdown

Connect more channels

Download spreadsheet 20 of 3048 attack campaigns

Outlook ⇄ Microsoft Teams ⇄ slack ← Navigation Bar

Source [ Advanced Attacks ⌄ ] Filter by ⊞

| Subject | From | Campaign Recipient(s) | Received | Engagement | Analysis | Remediation state |
|---|---|---|---|---|---|---|
| Payment Request<br>◉ BEC - Payment Fraud | Internal<br>hr@company.com<br>[∞ Imp.VIP] | 4 Recipients | 3 min ago<br>July 27 3:47PM PDT | ✉ 2 Replied To Attack<br>📂 Opened Attack | ◉ Invoice Fraud<br>[✉ Spoofed Email] [◆ Link] | Auto-Rededicated |
| Hey Bessie I was wonderin...<br>◉ Email Account Compromise | Evan Mccoy<br>UK8G2DVJ5<br>[∞ Imp.VIP] | Bessie Russell<br>PN2j8TTA4 | 2 hours ago<br>July 27 3:47PM PDT | ✉ 2 Replied To Attack | ◉ Billing Account Update Fraud<br>[✉ Spoofed Email]<br>[◆ Attachment] | Auto-Rededicated |
| Business Essentials Expired<br>◉ Credential Phishing | LM Financial Dept.<br>financial-department@lib<br>ertymutual.org | Ted Simmons<br>tsimmons@company.<br>com | 1 day ago<br>July 27 3:47PM PDT | ✉ Unopened | ◉ Invoice Fraud<br>[◆ Attachment]<br>[⊙ Young Domain(<30 days)]<br><br>◉ Billing Account Update Fraud | Auto-Rededicated |

FIG. 12A

Threat log

| | | | | | ⊞ | ⓘ John Doe ⌄ |
|---|---|---|---|---|---|---|

Abnormal Security  Dashboard  Threat Log  Abnormal Cases  Email Finder

| 12342 | 9823 | 1492 | 1027 | | [Download spreadsheet ⓘ] |
|---|---|---|---|---|---|
| Total Attacks Found by Abnormal Security | Outlook Email Attacks | Microsoft Team Messages | Stack Message | Connect more channels | |

Outlook  Microsoft Teams  slack 20 of 3048 attack campaigns

| Message | Sender (Source) | Recipient/Team (Destination) | Sent | Analysis |
|---|---|---|---|---|
| Have you gotten a chance to look at this link: http://off-55.tk/?qs=a9537c1ce661463614ad... | Claire Richards | #invoice 33 Members | 3 min ago July 27 3:47PM PDT | ◇ Suspicious Link |
| Make up more copy | Claire Richards | #finance 33 Members | 3 min ago July 27 3:47PM PDT | ◇ Suspicious Link |
| Make up more copy | Josh Waters | Renee West | 3 min ago July 27 3:47PM PDT | ◇ Suspicious Link |
| Make up more copy | Lynde Smith | Ashely Lombard | 3 min ago July 27 3:47PM PDT | ◇ Suspicious Link |
| Make up more copy | Claire Richards 8N2 IRTA4 | #system-admin 33 Members | 3 min ago July 27 3:47PM PDT | ◇ Suspicious Link |

FIG. 12B

Abnormal Cases  Threat Log  Dashboard

Business Essential Expired  
Arrived at inbox 2 minutes ago  2:28pm 10/14/2019

Take Action [Restore to Inbox (Not an attack)]   John Doe ⌄

Analysis Overview

ATTACK SCORE  
83

ATTACK TYPE  
VIP Impersonation (Requesting Action)

ATTACK ANALYSIS  
⚔ Strategy: Spoofed Email  
👤 Impersonated Party: VIP  
◎ Goal: Invoice Fraud  
◆ Vector: Attachment Abnormal Security has flagged this as a possible VIP Impersonation (Requesting Action) attack:

⚠ Atypical Contact  
We have previously observed 0 conversation between 'Josh Waters' and 'Jonathan Green'.

⚠ Urgent Financial Request  
Sender is requesting a payment, but with urgency [Can you assist in getting 2 payments out today]: this is unusual for normal operations but common for Business Email Compromise attack.

⚠ Possible Executive Impersonation  
This email is possibly impersonating Jonathan Green, Chief Financial Officer. Out of the 8443 real emails we've seen from Jonathan Green, 0 (0%) have been sent from 'jonathan.green@gmail.com'.

5 additional Insights, 300+ signals analyzed               What is this?

Campaign Activity
O365 Email  
📥 Arrived to Inbox  
7 Recipients  
↪ Forwarded by user  
1 Recipient  
✎ Replied to message  
2 Recipients  
⊙ Campaign Auto-Remediated  
3:48pm 10/14/2019

Related Communication  
⊕ Slack messages  
1 Related Message

[Default View | User View | Analysis]

Email Content
✉ Subject: Business Essentials Expired  
Sender: Microsoft Online Services Team <microsoft@powerapps.com>  
Recipient: Lynda Smith <lynda@enterprise.com>  
Oct 23rd 11:07 AM PDT ▽  
[View Original Email Headers]

Your Office 365 Business Essentials Invoice is ready

Overview
Analysis Overview  
Email Content

Analysis  
Content Analysis ○  
Sender Identity Analysis ○  
Relationship Analysis  
Detection Signals

Threat log

Abnormal Security   Dashboard   Threat Log   Abnormal Cases   Email Finder     ⊞   👤 John Doe ⌄

Threat log     [Download spreadsheet ⊙]

| | | |
|---|---|---|
| 12342<br>Total Attacks Found by Abnormal Security | 9823<br>Outlook Email Attacks | 1492<br>Microsoft Team Messages | 1027<br>Stack Messages | ⊕<br>Connect more channels |

Source [Outlook 🗂 Microsoft Teams ⌗ slack] [Advanced Attacks ⌄]   Filter by ⊞

20 of 3048 attack campaigns

| Subject | From | Campaign Recipient(s) | Received | Engagement | Analysis | Remediation state |
|---|---|---|---|---|---|---|
| Payment Request<br>⊙ BEC - Payment Fraud | Jonathan Green<br>jonathan.green@gmail.com<br>[∞ Imp.VIP] | 4 Recipients | 3 min ago<br>July 27 3:47PM PDT | | ⊙ Invoice Fraud<br>♂ Spoofed Email ◇ Link | Auto-Rededicated |
| Orion Limited Invoice<br>⊙ Email Account Compromise | Evan Mccoy<br>UK8G2DVJ5<br>[∞ Imp.VIP] | Bessie Russell | 2 hours ago<br>July 27 3:47PM PDT | | ⊙ Billing Account Update Fraud<br>♂ Spoofed Email<br>◇ Attachment | Auto-Rededicated |
| Business Essentials Expired<br>⊙ Credential Phishing | LM Financial Dept.<br>financial-department@lib ertymutual.org | Ted Simmons<br>tsimmons@company. com | 1 day ago<br>July 27 3:47PM PDT | 📄 1 Opened Attack | ⊙ Invoice Fraud<br>◇ Attachment<br>♂ Young Domain(<30 days) | Auto-Rededicated |
| Re: Payment Status<br>⊙ Vender Takeover | 3 Senders | 9 Recipients | 3 day ago<br>July 27 3:47PM PDT | 📄 2 Opened Attack<br>✎ 1 Replied To Attack | ⊙ Billing Account Update Fraud<br>♂ Spoofed Email<br>◇ Link | Auto-Rededicated |

FIG. 14 splunk>enterprise     ⓘ Administrator ▾   Messages ▾   Settings ▾   Activity ▾   Help ▾   [Find 🔍]

Apps ⚙

- Search & Reporting
- Gmail Audit
- Phishiq Search
- Splunk Security Essentials
- VirusTotal Malware Lookup for Splunk
- + Find More Apps

Explore Splunk Enterprise

| Product Tours | Add Data | Splunk Apps ↗ | Splunk Docs ↗ |
|---|---|---|---|
| New to Splunk? Take a tour to help you on your way. | Add or forward data to Splunk Enterprise. Afterwards, you may extract fields. | Apps and add-ons extend the capabilities of Splunk Enterprise. | Comprehensive documentation for Splunk Enterprise and for all other Splunk Products. |

Close ✕

Workload Management Overview ↗ ⚙

Workload Management Status

| Instance ⇅ | Roles ⇅ | OS ⇅ | Status ⇅ | Error Messages ⇅ |
|---|---|---|---|---|
| Ip-192-168-16-42.ce2.internal | Indexer<br>Kv<br>Store<br>License<br>Master<br>Search<br>Head | Darwin 18.6.8 | Unsupported / Disabled | Workload management cannot be enabled on this system because the feature is not supported. Check the status of workload management preflight checks for additional information. |

🔍 ⇅   i   ↻   <1m ago

Workload Pool Configuration

| Instance ⇅ | Roles ⇅ | Default Pool ⇅ | Ingest Pool ⇅ | All Pools ⇅ |
|---|---|---|---|---|
| Ip-192-168-16-42.ce2.internal | Indexer<br>Kv<br>Store<br>Licence<br>Master<br>Search | | | |

FIG. 16

MULTICHANNEL THREAT DETECTION FOR PROTECTING AGAINST ACCOUNT COMPROMISE

CROSS-REFERENCE TO RELATED APPLICATIONS

This application is a continuation of U.S. patent application Ser. No. 17/190,105, titled "Multichannel Threat Detection for Protecting Against Account Compromise" and filed on Mar. 2, 2021, which claims priority to U.S. Provisional Application No. 62/984,108, titled "Multichannel Support of Email-Focused Threat Detection Technologies" and filed on Mar. 2, 2020, each of which is incorporated by reference herein in its entirety.

TECHNICAL FIELD

Various embodiments concern computer programs and associated computer-implemented techniques for developing computer-implemented models that are able to examine communications across different channels to discover instances of account compromise.

BACKGROUND

Account compromise is an exploit in which an unauthorized entity (also referred to as an "attacker") gains access to the account of an employee of an enterprise (also referred to as a "business," "company," or "organization") and then imitates the employee. Examples of accounts include email accounts, messaging accounts, and accounts with integrated third-party services. By stealing the employee's identity, the attacker can defraud the enterprise and its employees, customers, and vendors. Collectively, these individuals may be referred to as the "targets" of the attacker.

Account compromise can take a variety of different forms. In many cases, attackers will focus their efforts on employees who have access to sensitive financial information or who are responsible for financial tasks such as paying invoices or initiating wire transfers. For example, an attacker may mimic the identity of an employee on an enterprise network (also referred to as a "business network," "company network," or "organization network") to trick a target into providing the account number of a financial account associated with the enterprise. As another example, an attacker may mimic the identity of an employee on an enterprise network to trick the target into providing sensitive information that is not publicly known.

BRIEF DESCRIPTION OF THE DRAWINGS

FIG. 11 includes a flow diagram of a process for performing cross-channel threat detection on behalf of an enterprise.

FIG. 12A-D depict examples of interfaces that identify possible threats to the security of an enterprise posed by communications across various channels.

FIG. 14 depicts an example of a threat log that includes an engagement column that indicates whether employees engaged with a communication indicative of a possible threat.

FIG. 16 depicts an example of a screenshot illustrating how an enterprise can create an application to be integrated with Splunk.

Figure 1:
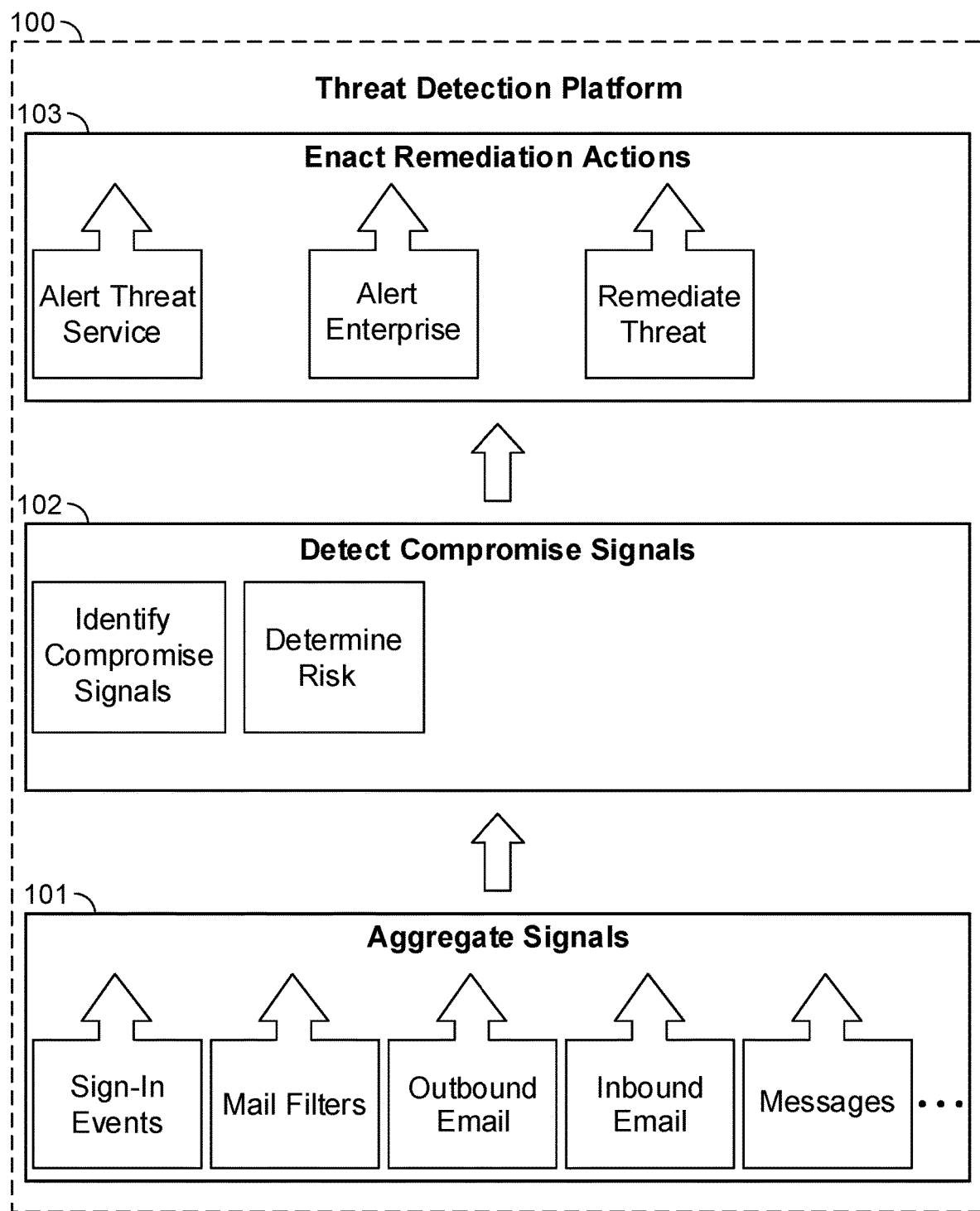
FIG. 1 illustrates how a threat detection platform may employ a multi-tiered approach to aggregate information (also referred to as "signals") related to the employees of an enterprise, examine the signals to discover compromise signals that may be indicative of account compromise, and then enact remediation actions to address the threat to an enterprise.

Various features of the technologies described herein will become more apparent to those skilled in the art from a study of the Detailed Description in conjunction with the drawings. Embodiments are illustrated by way of example and not limitation in the drawings. While the drawings depict various embodiments for the purpose of illustration, those skilled in the art will recognize that alternative embodiments may be employed without departing from the principles of the technologies. Accordingly, while specific embodiments are shown in the drawings, the technology is amenable to various modifications.

DETAILED DESCRIPTION

Account compromise (also referred to as "account takeover") essentially represent a form of identity theft. Identity theft involves stealing and then utilizing personally identifiable information (PII) like a driver license number, mailing address, or Social Security number. Account compromise, meanwhile, is a form of identity theft in which an attacker uses credentials to gain access to an account. For the purpose of illustration, embodiments may be described in the context of email accounts; however, those skilled in the art will recognize that the technology is similarly applicable to other types of accounts.

Traditionally, enterprises have protected themselves against business email compromise (BEC) campaigns—including those involving account compromise—by employing various defenses. For example, an enterprise may employ a filter that quarantines malicious emails, a blacklist that identifies malicious domains, or an identification scheme that causes internal emails to be visually distinguishable from external emails. These approaches are largely ineffective against account compromise, however. For this reason, account compromise often results in a series of fraudulent transactions that may be difficult, if not impossible, to fully remediate. This is problematic due to the significant threat of account compromise.

To address this issue, some enterprises have begun employing threat detection platforms that are designed to identify threats to those enterprises. As an example, a threat detection platform may examine the digital activities performed with email accounts associated with employees of an enterprise to determine whether any email accounts are exhibiting abnormal behavior. The threat detection platform can train a computer-implemented model (or simply "model") using information related to digital activities that were performed with an email account in the past in order to create a trained model that understands what constitutes normal behavior of that email account. Generally, these models are based on one or more machine learning algorithms, and thus may also be referred to as "machine learning models" or "ML models."

Employees have begun to increasingly communicate with one another over channels other than email, however. For example, employees may prefer to communicate with one another via a business communication platform (or simply "communication platforms"). Examples of communication platforms (also referred to as "messaging platforms") include Slack®, Microsoft Teams™, and Google Chat™. In fact, much of the internal communication that has historically occurred over email now takes place on communication platforms.

Introduced here, therefore, is a threat detection platform that is able to build, train, or otherwise develop models that are representative of the behavior of accounts across more than one channel. At a high level, the threat detection platform is able to:

Build models that are representative of behavioral profiles for employees across various channels;

Detect threats delivered through those various channels; and

Identify instances of account compromise across those various channels.

The threat detection platform may develop models in several different ways. Normally, each model is produced based on the digital activities performed with a corresponding account on a corresponding channel. As an example, assume that the threat detection platform is interested in better understanding the behavior of employees with respect to a collaboration suite (also referred to as a "productivity suite") through which emails can be sent and received. In such a scenario, the threat detection platform may produce a model for each employee that is based on emails that were sent or received with a corresponding account in the past. Alternatively, the threat detection platform could generate a model that is representative of the behavior of an account associated with an employee on one channel and then extend the model using communications from another channel. Thus, a model could be trained using past communications on more than one channel to improve robustness and usefulness. Such an approach may enable the threat detection platform to better understand when digital activities are legitimately unusual. Examples of channels include email channels, messaging channels (also referred to as "chat channels"), discussion forums, intranets, management tools (also referred to as "collaboration tools"), conferencing tools, and social media tools.

As further discussed below, a threat detection platform can improve its ability to detect threats to enterprises by monitoring the digital activities that are performed with accounts across a range of channels. Thus, the threat detection platform may be responsible for detecting external attacks, internal attacks, and instances of account compromise. Such an approach enables the threat detection platform to better address these threats. For example, upon detecting a threat, the threat detection platform may initiate a remediation action with respect to one or more accounts. Assume, for example, that the threat detection platform determines that an account associated with an individual may be compromised based on analysis of digital activities performed with the account. In such a scenario, the threat detection platform may perform a remediation action with respect to the account. Moreover, the threat detection platform may perform remediation actions with respect to one or more other accounts associated with the same individual. Examples of remediation actions include triggering a password reset, generating a notification, and logging into a Security Information and Event Management (SIEM) tool. In some embodiments, if the threat detection platform observes and then remediates, for example, an inbound email-based attack, then the threat detection platform could perform (or prompt performance of) an additional remediation action in another tool. For instance, the threat detection platform could push information regarding the inbound email-based attack to a SIEM tool or firewall.

Embodiments may be described in the context of a certain channel or a certain combination of channels for the purpose of illustration. However, those skilled in the art will recognize that that the technology could be employed to inhibit the impact of compromise of accounts across various channels. Moreover, embodiments may be described in the context of a certain type of digital activity, such as the transmission of an email via a collaboration suite or a message via a communication platform, for the purpose of illustration. However, those skilled in the art will recognize that the technology is equally applicable to other types of digital activities.

Embodiments may also be described in the context of computer-executable instructions for the purpose of illustration. However, aspects of the technology can be implemented via hardware, firmware, or software. As an example, a set of algorithms representative of a model may be applied to data related to a digital activity performed with an account in order to establish a likelihood that the account is compromised. This model may produce, as output, a score that is indicative of the deviation from past digital activities performed with the account, and this score may be used to establish what remediation actions, if any, are necessary.

Terminology

References in the present disclosure to "an embodiment" or "some embodiments" mean that the feature, function, structure, or characteristic being described is included in at least one embodiment. Occurrences of such phrases do not necessarily refer to the same embodiment, nor are they necessarily referring to alternative embodiments that are mutually exclusive of one another.

The terms "comprise," "comprising," and "comprised of" are to be construed in an inclusive sense rather than an exclusive sense (i.e., in the sense of "including but not limited to"). The term "based on" is also to be construed in an inclusive sense rather than an exclusive sense. Thus, unless otherwise noted, the term "based on" is intended to mean "based at least in part on."

The terms "connected," "coupled," and variants thereof are intended to include any connection or coupling between two or more elements, either direct or indirect. The connection/coupling can be physical, logical, or a combination thereof. For example, elements may be electrically or communicatively coupled to one another despite not sharing a physical connection.

The term "module" may refer broadly to software, firmware, and/or hardware. Modules are typically functional components that generate one or more outputs based on one or more inputs. A computer program may include or utilize one or more modules. Thus, a computer program may utilize multiple modules that are responsible for completing different tasks or a single module that is responsible for completing all tasks.

When used in reference to a list of multiple items, the word "or" is intended to cover all of the following interpretations: any of the items in the list, all of the items in the list, and any combination of items in the list.

The sequences of steps performed in any of the processes described here are exemplary. However, unless contrary to physical possibility, the steps may be performed in various sequences and combinations. For example, steps could be added to, or removed from, the processes described here. Similarly, steps could be replaced or reordered. Thus, descriptions of any processes are intended to be open-ended.

Overview of Threat Detection Platform

A threat detection platform can be designed to discover possible instances of account compromise, external attacks, or internal attacks in order to identify threats to the security of an enterprise. As further discussed below, internal and external attacks can be medium non-specific. Thus, a threat detection platform could be programmed to identify different types of compromised accounts. Similarly, a threat detection platform could be programmed to identify attacks in different channels (also referred to as "forums") of communication, such as email, chat, and the like. For example, a threat detection platform may be configured to examine the digital activities performed with accounts associated with employees of the enterprise to determine whether any of these accounts are exhibiting abnormal behavior. For each account, this determination could be based on the nature of the digital activities performed with that account and/or the other accounts with which that account has interacted. While embodiments may be described in the context of email accounts, those skilled in the art will recognize that the threat detection platform could monitor digital activities performed with other types of accounts, such as accounts for messaging platforms, integrated third-party services, etc.

Generally, an account will be identified as possibly compromised if the threat detection platform discovers that the account either (i) performed at least one digital activity that deviated from past behavior in a meaningful way or (ii) performed at least one digital activity that increased the risk to the security of the enterprise. One example of a digital activity that increases the risk to the security of the enterprise is the transmission of a message (e.g., via a communication platform, such as Microsoft Teams or Slack) that includes a uniform resource locator (URL) for a phishing page. Other examples of risky digital activities include the transmission of a fraudulent invoice via internal email and the transmission of a phishing attack via internal email. The term "internal email" refers to emails sent within an enterprise (e.g., from an email account associated with one employee to an email account associated with another employee). Generally, internal emails are delivered via an enterprise mail system (also referred to as a "corporate mail system") without traversing the Internet. The term "external email," meanwhile, may refer to emails that are received from, or transmitted to, addresses external to the enterprise.

As further discussed below, the threat detection platform may build a separate model for each account associated with an enterprise that is representative of the normal behavior of the corresponding employee. The threat detection platform can compare the digital activities performed with each account to the corresponding model to see whether any deviations exist. Deviations may be indicative of potential compromise since it means the behavior of the account has changed. By establishing what constitutes normal behavior on a per-employee basis, the threat detection platform can more readily discover and then address instances of account compromise before the enterprise is harmed.

Moreover, the threat detection platform may leverage machine learning, heuristics, rules, or human-in-the-loop feedback to improve its ability to discover instances of account compromise. For example, the threat detection platform may employ a series of rules that separately examine attributes of a communication generated by an account. Note that the term "communication" may be used to refer to emails, messages, and the like. Examples of attributes include time of transmission, geographical origin, sender identity, sender account identifier (e.g., email address or phone number), recipient identity, recipient account identifier, subject, body content, presence or content of attachments, etc. Based on these attributes, the series of rules may indicate whether the account should be examined further due to suspected compromise.

If the threat detection platform determines that an account may be compromised, the threat detection platform may automatically determine which remediation actions, if any, are appropriate. The remediation actions may depend on the confidence level of the threat detection platform in its determination, the types of digital activities that prompted suspicion, or the threat posed by the compromise. For example, if the threat detection platform determines there is a low likelihood that the email account has been compromised, then the threat detection platform may simply identify the account as needing further monitoring. However, if the threat detection platform determines there is a high likelihood that the account has been compromised, then the threat detection platform may restrict access to an enterprise network or prevent further digital activities from being performed. For instance, the threat detection platform could temporarily divert communications generated by the account into a quarantine environment until further analysis can occur. As another example, the threat detection platform may terminate all active sessions of the account and prompt the true owner to reset her password. As another example, the threat detection platform may post a notification that specifies the account may be compromised in a chat thread in which the account participates. As further discussed below, the likelihood that the account has been compromised may be determined based on the volume, nature, or type of digital activities performed with the account under examination.

To gain a more holistic understanding of the threats experienced by an enterprise, the threat detection platform may apply an integrative multichannel approach for discovering inbound attacks and instances of account compromise. The term "inbound attack" refers to attacks from external third parties (also referred to as "attackers") external to the enterprise, while the term "account compromise" refers to internal attacks (also referred to as "intra-enterprise attacks") that are launched from a compromised account associated with an employee of the enterprise. For account compromise, integration may be useful as a means to add information that is needed to establish the risk and appropriate remediation actions. Meanwhile, the multichannel approach may be useful as a means to inform or bolster suspected instances of account compromise, as well as detect malicious activities and perform remediation actions. For instance, the threat detection platform may determine that a given account (e.g., jane.doe@company.com) appears to be compromised based on one or more digital activities that were performed with the given account on a communication platform, such as Microsoft Teams or Slack. To follow up, the threat detection platform may build an account compromise case, but may also take some remediation action on messages posted by the given account on a channel corresponding to the communication platform. For example, the threat detection platform could post a notification (also referred to as a "bot warning") to warn others of the compromise, delete messages generated by the given account, etc.

FIG. 1 illustrates how a threat detection platform 100 may employ a multi-tiered approach to aggregate information (also referred to as "signals") related to the employees of an enterprise (step 101), examine the signals to discover compromise signals that may be indicative of account compromise (step 102), and then enact remediation actions (step 103) to address the threat to an enterprise.

The threat detection platform 100 can be completely integrated within the enterprise environment. For example, the threat detection platform may receive input indicative of an approval by an individual (e.g., an administrator associated with the enterprise) to access data related to the digital activities performed with accounts associated with employees of the enterprise. The data may include, for example, information on emails (e.g., incoming emails and outgoing emails), messages, third-party service usage (e.g., access events, access locations, document views, and document requests), intranet usage (e.g., access events, queries, and document views), telephonic activity, mail filters, mail groups, sign-in events, identity risk events, active directory, accessed documents, etc. The approval may be given through an interface generated by the threat detection platform 100. For example, the individual may access an interface generated by the threat detection platform 100 and then approve access to the data as part of a registration process.

Then, the threat detection platform 100 can establish a connection with one or more storage mediums that include the data via corresponding application programming interfaces (APIs). For example, the threat detection platform 100 may establish, via an API, a connection with a computer server managed by the enterprise or some other entity on behalf of the enterprise. The threat detection platform 100 can download the data from the storage medium(s) in a programming environment managed by the threat detection platform 100. For instance, the threat detection platform 100 may obtain information regarding the outgoing messages, intranet access events, outgoing emails, mail filters, or sign-in events associated with each account managed by the enterprise. As further discussed below, the threat detection platform 100 may process the information in order to define a series of digital activities performed with each account over time. The information that defines each digital activity may be referred to as a "signal."

Accordingly, the threat detection platform 100 may be designed to obtain and/or monitor data in at least one datastore via respective APIs, aggregate the data in these datastores, and then canonicalize the data into a single event stream in order to perform behavioral analysis (e.g., by detecting deviations in behavior). Such an approach ensures that the data in these various datastores (also referred to as "databases") can be holistically monitored to gain a better understanding of behavioral patterns on a per-account, per-employee, or per-enterprise basis. Since the data can be accessed via APIs, direct integration (e.g., into the computing environment of an enterprise) normally is not necessary.

In some embodiments, the threat detection platform 100 is programmed to build a separate machine learning (ML) model for each employee based on the retrospective information regarding the digital activities performed with the corresponding account in order to better identify instances of account compromise in near real time. For example, the threat detection platform 100 may ingest digital activities performed with an account over the last six months, and then the threat detection platform may build an ML model that understands how the account normally accesses a collaboration suite or communication platform (e.g., based on sign-in events, geographical location, etc.). As another example, the threat detection platform may build an ML model that understands how the account normally communicates internally (e.g., with other employees via a collaboration suite or communication platform). The ML model may help identify when the behavior of the account has changed.

Such an approach allows the threat detection platform 100 to employ an effective ML model nearly immediately upon receiving approval from the enterprise to deploy it. Unlike conventional security products that only have access moving forward in time (i.e., after receiving the approval), the threat detection platform 100 may employ a backward-looking approach to develop ML models that are effective upon deployment. Such an approach also enables the threat detection platform to go through a repository of past digital activities to identify whether any accounts should presently be suspected of compromise.

The aforementioned API-based approach provides a consistent way of looking at information related to the digital activities performed with accounts belonging to employees of an enterprise. Because the threat detection platform 100 can directly access the communications transmitted and received by these accounts, the threat detection platform 100 can examine the communications that are invisible to standard integration solutions. For example, a SEG integration that occurs through the mail exchanger (MX) record will only be able to see external emails arriving from, or destined for, external sources. The only way to make internal emails visible to the SEG integration would be to externally reroute the emails through the gateway, and purely internal communications such as messages are completely invisible to the SEG integration.

The threat detection platform 100 may design, generate, and train the ML models to discover possible instances of account compromise by examining the aggregated signals. As shown in FIG. 1, the threat detection platform 100 can parse the aggregated signals to identify compromise signals (also referred to as "indicators of compromise") that indicate an account may be compromised, and then the threat detection platform can determine the risk to the enterprise based on the compromise signals. The term "compromise signal," as used herein, may refer to information related to a digital activity that indicates the corresponding account may be compromised. One example of a compromise signal is a URL for a phishing page discovered in the body of a message delivered via a communication platform, such as Slack, Microsoft Teams, or Google Hangouts. Another example of a compromise signal is a recipient account that has not been contacted in the past.

If the threat detection platform discovers a compromise signal related to the digital activity, the threat detection platform may determine what remediation actions, if any, are appropriate as shown in FIG. 1. For example, the threat detection platform may notify a threat service (also referred to as a "security service") that the account may be compromised. As another example the threat detection platform may notify the enterprise that the account may be compromised. For instance, the notification may be delivered to an individual in the information technology (IT) department of the enterprise. Additionally or alternatively, the threat detection platform may automatically perform remediation actions based on the confidence level of the threat detection platform in its determination, the types of digital activities that prompted suspicion, or the threat posed by the compromise.

Figure 2:
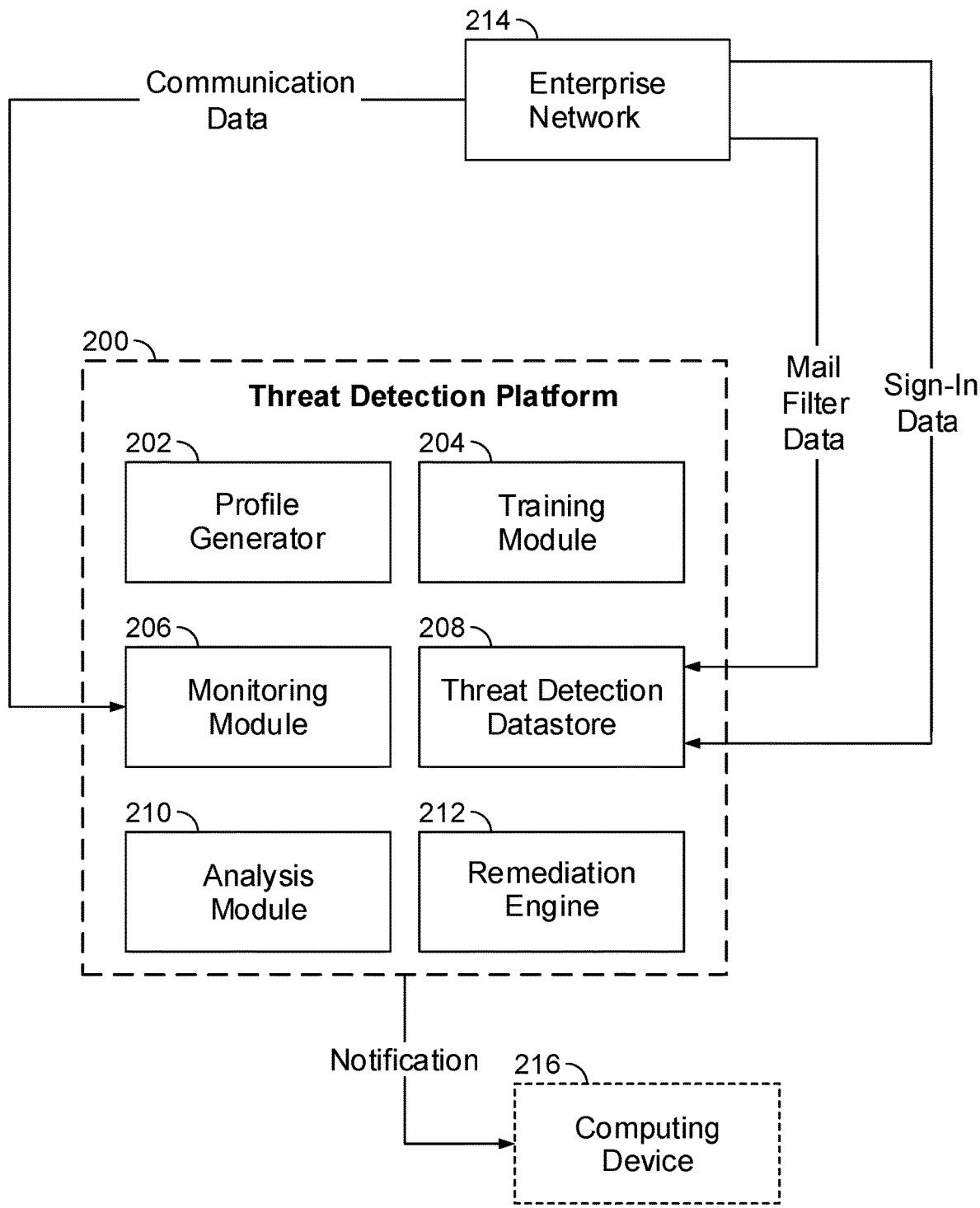
FIG. 2 depicts an example of a platform able to detect threats to an enterprise network (also referred to as a "customer network" or "corporate network") posed by accounts belonging to employees.

FIG. 2 depicts an example of a platform 200 able to detect threats to an enterprise network 214 (also referred to as a "customer network" or "corporate network") posed by compromised accounts belonging to employees. Examples of accounts include email accounts associated with collaboration suites (e.g., Microsoft Office 365 or Google Workspace), messaging accounts associated with messaging platforms (e.g., Slack, Microsoft Teams, or Google Chat), and accounts associated with other integrated third-party services. The term "other integrated third-party services" may refer to third-party services that are used by employees but not for communication purposes. Examples of other third-party services include Okta, Splunk, Workday, Box, Microsoft OneDrive, and Dropbox.

As shown in FIG. 2, the threat detection platform 200 may include a profile generator 202, a training module 204, a monitoring module 206, a threat detection datastore 208, an analysis module 210, and a remediation engine 212. Some embodiments of the threat detection platform 200 include a subset of these components, while other embodiments of the threat detection platform 200 include additional components that are not shown in FIG. 2.

At a high level, the threat detection platform 200 can acquire data related to digital activities involving the accounts and then determine, based on an analysis of the data, whether any of these accounts have been compromised. As shown in FIG. 2, the data may include information related to communications, mail filters, sign-in events, and the like. Thus, the threat detection platform 200 can detect possible instances of account compromise based on an analysis of messages (e.g., the content or attachments), emails (e.g., the content or attachments), communication metadata (e.g., information regarding the sender, recipient, origin, time of transmission, etc.), sign-in metadata (e.g., information regarding the time and location of each sign-in event), and other suitable data.

Additionally or alternatively, the threat detection platform 200 may be able to obtain data related to digital activities involving the accounts from a third-party service as further discussed below. For example, the threat detection platform 200 may obtain data from a third-party service instead of, or in addition to, the data obtained from the enterprise network 214.

Accordingly, the threat detection platform 200 can be implemented, partially or entirely, within the enterprise network 214, a remote computing environment (e.g., through which communications, or information related to those communications, can be routed for analysis), a gateway, or another suitable location. The remote computing environment can belong to, or be managed by, the enterprise or another entity. The threat detection platform 200 may be integrated into (i) the enterprise's email system via an API and (ii) one or more third-party services via respective APIs. As an example, the threat detection platform 200 may receive data regarding emails received and transmitted by a first set of accounts via a first API (e.g., the Microsoft Outlook® API) and data regarding messages received and transmitted by a second set of accounts via a second API (e.g., the Slack API).

In a first variation, the threat detection platform 200 is maintained by a threat service (also referred to as a "security service") that has access to multiple enterprises' data. In this variation, the threat detection platform 200 can route data related to digital activities to a computing environment managed by the security service. The computing environment may be, for example, an instance on Amazon Web Services (AWS). The threat detection platform 200 may maintain one or more databases for each enterprise that includes, for example, organization charts, attribute baselines, communication patterns, etc. Additionally or alternatively, the threat detection platform 200 may maintain federated database(s) shared amongst multiple entities such as detector databases, vendor databases, etc. The security service may maintain different instances of the threat detection platform 200 for different enterprises, or the security service may maintain a single instance of the threat detection platform 200 for multiple enterprises. The data hosted in these instances can be obfuscated, encrypted, hashed, depersonalized (e.g., by removing personal identifying information), or otherwise secured or secreted. Accordingly, each instance may only be able to access/process data related to the digital activities performed with the accounts associated with the corresponding enterprise(s).

In a second variation, the threat detection platform 200 is maintained by the enterprise whose communications are being monitored (e.g., either remotely or on premises). In this variation, all relevant data related to digital activities can be hosted by the enterprise itself, and any information to be shared across multiple enterprises can be shared with a computing system maintained by the security service or a third party.

As shown in FIG. 2, the profile generator 202, training module 204, monitoring module 206, threat detection datastore 208, analysis module 210, and remediation engine 212 can be part of the threat detection platform 200. Alternatively, these components could be implemented individually. For example, the remediation engine 212 may be implemented in a remote computing environment to which the threat detection platform 200 is communicatively connected across a network. The threat detection platform 200 may be implemented by the security service, an enterprise, an individual associated with the enterprise, a trusted third party, or another service, entity, or individual. In some embodiments, aspects of the threat detection platform 200 are enabled by a web-accessible computer program operating on a computer server or a distributed computing system. For example, an individual may be able to interface with the threat detection platform 200 through a web browser executing on a computing device.

The enterprise network 214 can be a mobile network, wired network, wireless network, wireless spectrum network, or another communication network maintained by the enterprise or an operator on behalf of the enterprise. As noted above, the enterprise may utilize a security service to examine communications (among other things) to discover possible instances of account compromise. The enterprise may grant permission to the security service to monitor the enterprise network 214 by examining communications (e.g., messages, incoming emails, and outgoing emails), analyzing those communications to discover possible instances of account compromise, and then performing some remediation action if a threat is discovered. In some embodiments, the enterprise further grants permission to the security service to obtain data about other digital activities involving the enterprise (and, more specifically, employees of the enterprise) in order to build a profile that specifies communication patterns, behavioral traits, normal content, etc.

The threat detection platform 200 may include one or more databases in which enterprise data, threat analysis data, remediation policies, communication patterns, behavioral traits, and other data can be stored. Here, for example, the threat detection platform 200 includes a threat detection datastore 208 that includes communication data, mail filter data, and sign-in data associated with the accounts belonging to employees of an enterprise. Other types of data, such as data related to identity risk events, could also be stored in the threat detection datastore 208. This data may be determined by the threat detection platform 200 (e.g., learned from data available on the enterprise network 214), provided by the enterprise, or retrieved from an external database (e.g., associated with Slack, Splunk, Microsoft Office 365, Google Workspace, LinkedIn®, etc.). In some embodiments, the threat detection datastore 208 also stores outputs produced by the threat detection platform 200, including machine- and human-readable information on discovered instances of account compromise and any remediation actions that were taken.

By examining the communication data, mail filter data, and sign-in data, the threat detection platform 200 can discover organizational information (e.g., the employees, titles, and hierarchy), employee behavioral traits (e.g., based on historical communications and historical sign-in events), normal communication content, normal email addresses, communication patterns (e.g., who each employee communicates with internally and externally, when each employee typically communicates, which channel each employee prefers), etc.

In some embodiments, the threat detection platform 200 includes a profile generator 202 that generates one or more profiles for the enterprise. For example, the profile generator 202 may generate a separate profile for each account associated with an employee of the enterprise based on the communication data, mail filter data, or sign-in data. Additionally or alternatively, profiles may be generated for business groups, organizational groups, or the enterprise as a whole. These profiles are preferably used as the baseline for what constitutes normal activity by each account (or group of accounts) but could be used in other manners.

A profile could include a number of behavioral traits associated with the corresponding account. For example, the profile generator 202 may determine the behavioral traits based on the communication data, mail filter data, and sign-in data obtained from the enterprise network 214. The communication data may include information on the recipients of past communications (e.g., messages or emails) sent by a given account, content of the past communications, frequency of the past communications, temporal patterns of the past communications, formatting characteristics (e.g., usage of HTML, fonts, styles, etc.), sensitive topics on which the corresponding employee is explicitly or implicitly authorized to communicate, geographical location from which the past communications originated, and more. Thus, the profile generator 202 may attempt to build a profile for each account that represents a model of normal behavior of the corresponding employee (and, by extension, what abnormal behavior may constitute for purposes of identifying possible instances of account compromise).

Examples of questions that the profile may attempt to address for a given account include: What accounts does the given account communicate with? What topics does the given account normally discuss? What are normal login times for the given account? What are normal sending times for the given account? What Internet Protocol (IP) addresses does the given account log in from? What geographical locations does the given account log in from? Does the given account have any suspicious filters set up (e.g., to automatically delete incoming emails that contain certain keywords to conceal illicit activity)? What tone/style does the given account use? What terms (e.g., "cheers" or "thanks") are typically used by the given account? When the given account sends communications with links/attachments, what are the characteristics (e.g., name, extension, type, and size) of those attachments?

The monitoring module 206 operates to monitor communications handled by the enterprise network 214, a collaboration suite used by the enterprise, or a communication platform used by the enterprise. These communications may include instant messages (or simply "messages") exchanged between accounts associated with employees of the enterprise, incoming emails (e.g., external emails and internal emails) received by accounts associated with employees of the enterprise, and outgoing emails (e.g., external emails and internal emails) transmitted by accounts associated with employees of the enterprise. Those skilled in the art will recognize that the same accounts need not necessarily perform all of these actions. For instance, for a given employee, the monitoring module 206 may examine the outbound email transmitted from a given email account, the messages posted by a given messaging account, the access events associated with a given third-party service account, etc.

In some embodiments, the monitoring module 206 is able to monitor communications in near real time so that actions can be taken if a possible instance of account compromise is discovered. For example, if the monitoring module 206 discovers that a message generated by an account indicates that the account may be compromised, the remediation engine 212 may temporarily prevent all outgoing messages transmitted by the account from reaching their intended destination. In some embodiments, the monitoring module 206 is able to monitor communications only upon the threat detection platform 200 being granted permission by the enterprise (and thus given access to the enterprise network 214).

The analysis module 210 operates to analyze each digital activity performed with an account to determine the likelihood that the account has been compromised. For example, the analysis module 210 may examine each communication received and/or transmitted by the account to determine whether those communications deviate from past communication activity. In such embodiments, the analysis module 210 may determine whether a given communication deviates from the past communication activity (and thus may be indicative of compromise) based on its primary and/or secondary attributes. For example, the analysis module 210 may determine that compromise is likely if an account logs into the enterprise network 214 in an unusual location (e.g., China) or at an unusual time (e.g., 3 AM) based on a comparison to past sign-in events. As another example, the analysis module 210 may determine that compromise is likely if an account transmits a message that deviates from the characteristics of past messages transmitted by that account (e.g., pertains to an unfamiliar topic, is delivered to an unfamiliar account, has different terminology or formatting, includes a link with no context).

The analysis module 210 can make use of heuristics, neural networks, rules, decision trees (e.g., gradient-boosted decision trees), or ML-trained algorithms (e.g., decision trees, logistic regression, linear regression). Accordingly, the analysis module 210 may output discrete outputs or continuous outputs, such as a probability metric (e.g., specifying likelihood of compromise), a binary output (e.g., compromised or not compromised), an attack classification (e.g., specifying the type of scheme employed), etc.

For each communication created by an account, the analysis module 210 may determine whether the communication deviates from traits (e.g., related to behavior, content, or context) learned from past communications created by the account. The deviation may be a numerical value or percentage representing a delta between a trait and a corresponding feature extracted from the communication. For example, if the trait specifies that messages are transmitted by Joe.Smith@Enterprise.com via a communication platform almost exclusively between 8 AM and 5 PM, then a message transmitted at 3 AM may be assigned a relatively high deviation value. However, if Joe.Smith@Enterprise.com sends messages between 5 PM and 8 AM approximately 20 percent of the time, then the deviation value will be lower than the previous example.

These deviation values can be fed by the analysis module 210 as input into one or more attack detectors, each of which can generate an output. Each attack detector may be a rules-based engine, heuristic engine, or ML model designed to detect possible instances of a given type of attack. For example, these deviation values may be fed into an ML model designed, generated, or trained to identify theft schemes. The analysis module 210 may flag the account as possibly compromised if an indication is received from the attack detector(s) that a deviation threshold has been exceeded.

The remediation engine 212 may perform one or more remediation actions in response to the analysis module 210 determining that an account may be compromised. The remediation action(s) may be based on the nature of the threat, the policies implemented by the enterprise, etc. These policies may be predefined or dynamically generated based on inference, analysis, or the data obtained from the enterprise network 214. Examples of remediation actions include moving communications generated by the compromised account into a hidden folder (also referred to as a "quarantine folder") for further analysis, preventing the compromised account from accessing resources on the enterprise network 214, sending notifications (e.g., to the actual employee, enterprise, or member of the security service), resetting the password of the compromised account, ending all active sessions of the compromised account, and resetting connections with services or databases accessible via the enterprise network 214.

The remediation engine 212 may provide results produced by the monitoring module 206 or some other output (e.g., a notification that an account may be compromised) to a computing device 216. The computing device 216 may be managed by the employee associated with the account under examination, an individual associated with the enterprise (e.g., a member of the information technology department), or an individual associated with a security service. In some embodiments, the remediation engine 212 sends the output in a human-readable format for display on an interface accessible via the computing device 216.

Some embodiments of the threat detection platform 200 include a training module 204 that operates to train the ML model(s) employed by the analysis module 210. For example, if the analysis module 210 is designed to apply ML model(s) to the communication data, mail filter data, or sign-in data, the training module 204 can train the ML model(s) by feeding training data into those ML model(s). As shown in FIG. 2, these data could be obtained directly from the enterprise network 214, or these data could be obtained from other sources via respective APIs. The training data could include labeled digital activities (e.g., communications that have been labeled as attacks or non-attacks), policies related to attributes of those digital activities (e.g., that sign-in events occurring in a given geographical location are authentic due to the use of a virtual private network (VPN) service), etc. The training data may be employee- or enterprise-specific so that the ML model(s) are able to perform personalized analysis. In some embodiments, the training data ingested by the ML model(s) includes malicious communications that are representative of known instances of account compromise. For example, these malicious communications may include language known to represent instances of fraud. As another example, these malicious communications may include links to URLs or attachments known to represent instances of phishing.

While communications may be readily obtainable across a variety of different channels, this is not always the case. For example, the APIs associated with some third-party services are protected, so integrating with those channels may be more difficult. In such instances, the threat detection platform may need to be whitelisted by these third-party services. Additionally or alternatively, the threat detection platform could connect with third-party services by other means. For example, the threat detection platform may be given an administrative account (also referred to as a "service account") by the third party that has certain privileges (e.g., can observe access events).

Moreover, some third-party services restrict access to certain types of data. For example, the threat detection platform may be unable to read the content of messages delivered via some communication platforms (e.g., Microsoft Teams) using APIs since access is not available via application-level permissions. Similarly, some communication platforms may prohibit the threat detection platform from editing and/or quarantining messages. When a message delivered by one of these communication platforms is determined to possibly be a threat, the threat detection platform can simply post a message in the same thread that specifies the risk posed by the message.

Overview of Multichannel Threat Detection

As mentioned above, employees have begun to increasingly communicate with one another over channels other than email. For example, employees may communicate with one another using a communication platform (e.g., by sending messages) instead of, or in addition to, collaboration suite (e.g., by sending emails). Introduced here, therefore, is a threat detection platform that is able to build, train, or otherwise develop models that are representative of the behavior of accounts across more than one channel.

Assume, for example, that an employee ("Employee A") has accounts on several channels through which communication can occur. For instance, Employee A may have separate accounts for a collaboration suite (e.g., Microsoft Office® 365 or Google Workspace™) and a communication platform (e.g., Slack or Microsoft Teams). For each account, the threat detection platform may maintain and resolve a canonical identify for Employee A. Thus, if Employee A uses a first account associated with a collaboration suite and a second account associated with a communication platform, then the threat detection platform may assign an identifier to the first and second accounts that indicates both accounts are used by the same person. In a sense, the threat detection platform may consider digital activities performed with the first and second accounts as being performed by the same person. In some embodiments, the identifier is a deterministic identifier that is assigned to the first and second accounts based on identifiable information included in, or derivable from, data related to digital activities performed with those accounts. In other embodiments, the identifier is a probabilistic identifier that is assigned to the first and second accounts based on signals indicative of similar behavior that are included in, or derivable from, data related to digital activities performed with those accounts.

For each channel, the threat detection platform can connect to a respective database through a respective API as further discussed below. Many cloud-based products, including collaboration suites and communication platforms, have begun supporting APIs through which information regarding digital activities can be obtained. This API-focused approach to integration may enable the threat detection platform to obtain data regarding the digital activities that are performed by employees (and, more specifically, with accounts associated with those employees) on various channels. For example, the threat detection platform may be able to extract information regarding sign-in events, incoming communications, outgoing communications, and the like. Examples of communications include emails and messages.

The threat detection platform may also build profiles by levering the API integrations. Assume, for example, that the threat detection platform is interested in building a series of profiles for a series of accounts associated with a given channel (e.g., Microsoft Office 365). For each account, the threat detection platform can generate the corresponding profile based on the digital activities that were performed with that account in the past. The threat detection platform may do this for each channel of interest. Note, however, that databases are unique to the corresponding channels, and thus will contain different information. As an example, information obtained from a database associated with Microsoft Office 365 will be different than information obtained from a database associated with Google Workspace. Different information could be obtained from these databases depending on the capabilities of the respective APIs. For example, information regarding sign-in events may be obtainable for some channels but not others.

At a high level, these profiles are intended to establish the degree of normalcy for different people and behaviors. Accordingly, these profiles may fall into two categories, namely, person profiles and behavior profiles. Normally, each account associated with a given channel is associated with one person profile and one behavior profile. The person profile may attempt to identify the corresponding employee based on, for example, the locations of past sign-in events and other information available through the given channel. Meanwhile, the behavior profile may attempt to model typical behavior of the corresponding account. For instance, the behavior profile may specify other accounts with which the account normally communicates, the times at which the account normally communicates, etc. As an example, a behavior profile created for an account associated with Microsoft Office 365 may specify other accounts with which the account normally exchanges emails. As another example, a behavior profile created for an account associated with Slack may specify other accounts with which the account normally exchanges messages.

Then, the threat detection platform can combine individual profiles across different channels. As further discussed below, this can be accomplished by resolving to a canonical identifier that is shared across all channels of interest. Normally, the threat detection platform separately combines person and behavior profiles. Accordingly, for a given employee, the threat detection platform may produce (i) a cross-channel person profile that includes one or more person profiles that include relevant information about the given employee that is gleaned from one or more channels and (ii) a cross-channel behavior profile that includes one or more behavior profiles that include information regarding behavior of the given employee across the one or more channels. The cross-channel person profile could be used to answer questions including:

What is the title or role of an employee within an enterprise?
What type of information should an employee have access to?
Is the location of a given sign-in event normal for this employee?

Meanwhile, the cross-channel behavior profile could be used to answer questions including:

How frequently does an employee communicate with another person across any channel?
How frequently does an employee communicate with another person about a particular topic in a given channel?
How frequently does an employee communicate with another person about a particular topic across any channel?

This other person could be another employee of the same enterprise or an external contact, such as a vendor, customer, etc.

Figure 3:
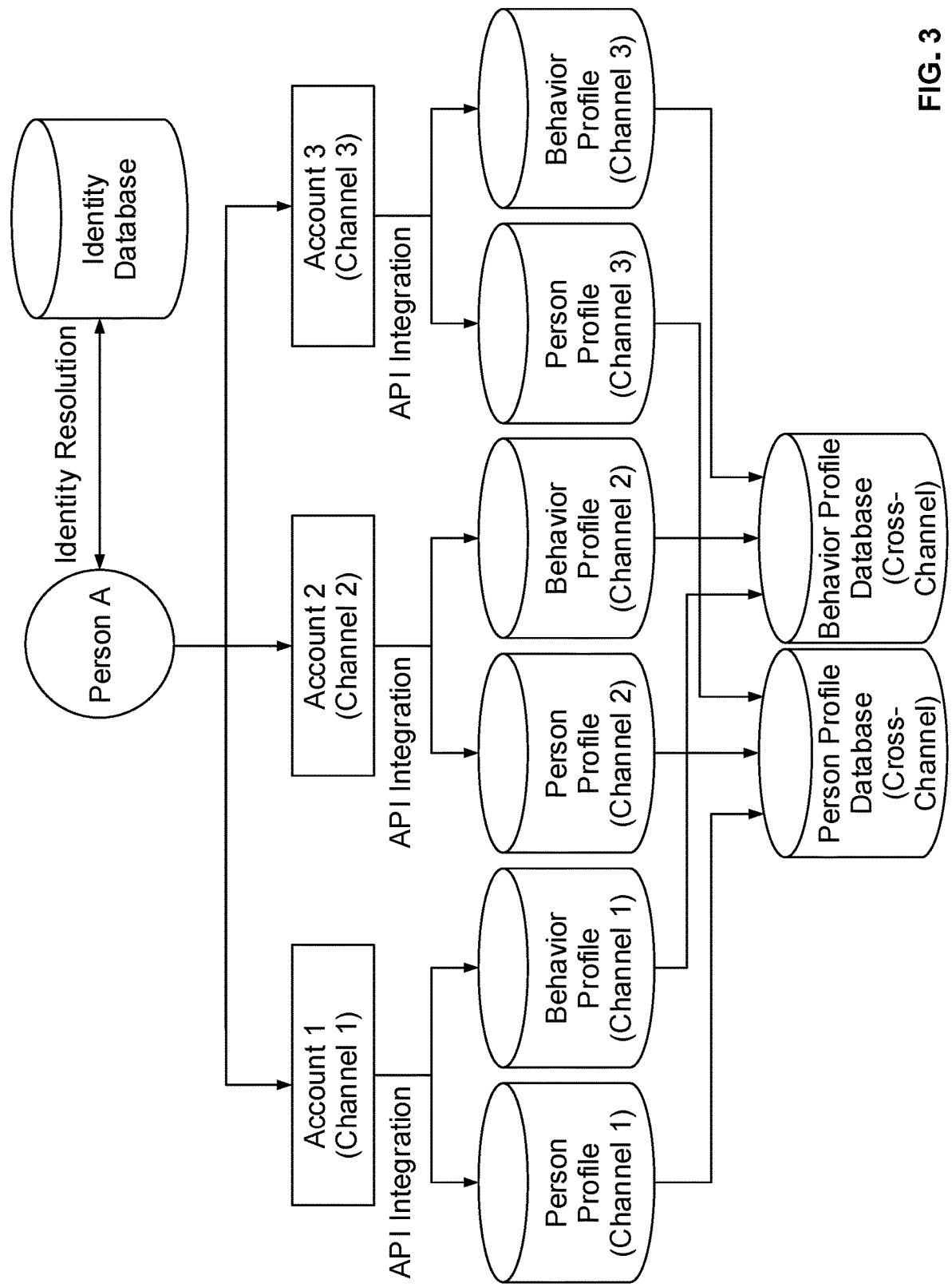
FIG. 3 illustrates how profiles can be maintained for an individual ("Person A") across more than one channel.

FIG. 3 illustrates how profiles can be maintained for an individual ("Person A") across more than one channel. Here, for example, three accounts associated with the individual are monitored by a threat detection platform. These accounts are associated with different channels over which the individual is able to communicate. As shown in FIG. 3, the threat detection platform may create a pair of profiles for each account. Each pair of profiles may be based on digital activities that were performed with the corresponding account in the past.

Each person profile may include information related to the owner that is received, derived, or otherwise obtained from the corresponding channel. Here, for example, the person profile produced for Channel 1 may include information that is available through that channel regarding Person A. Examples of such information include the geographical locations of historical sign-in events, salutations in communications (e.g., "Hey John," "Dear John"), and the like.

Each behavior profile may attempt to model behavior that is typical of the corresponding account on the corresponding channel. Here, for example, the behavior profile produced for Channel 1 may specify the other accounts with which Account 1 has historically communicated with on Channel 1. As another example, the behavior profile produced for Channel 1 may specify the times at which sign-in events involving Account 1 have historically occurred on Channel 1.

Each person and behavior profile may be produced by the threat detection platform in an independent manner. Thus, the person profile produced for Account 1 associated with Channel 1 will not be affected by digital activities performed with Account 2 on Channel 2. However, these profiles could be used for identity resolution purposes, as further discussed below. For example, the threat detection platform may be able to establish that Account 1 on Channel 1 and Account 2 on Channel 2 are likely associated with the same person (i.e., Person A) based on a comparison of the respective person profiles and/or behavior profiles.

Approaches to Monitoring and Remediating Attacks Via Channel

Assume, for example, that an attacker is interested in launching an attack against an employee (also referred to as a "target" of the attack). The attacker could launch a single attack against any individual channel for which the employee has an account, or the attacker could launch—either simultaneously or sequentially—multiple attacks against accounts for multiple channels.

An attack can be characterized along dimensions referred to as "facets," and these facets may indicate the type of attack that is being carried out. Generally, it is important to establish the type of attack that is being carried out as there may be different strategies for addressing different types of attacks. For example, a communication may be associated with one or more of the following facets:

Attack Type: This facet indicates whether the communication is representative of account compromise, impersonation, phishing, spoofing, spam, etc.

Impersonated Party: This facet indicates who, if anyone, the communication is intended to impersonate. Examples include very important persons (VIPs) such as c-suite executives, assistants, employees, contractors, partners, vendors, internal automated systems, external automated systems, or no one in particular.

Attacked Party: This facet indicates who was the target of the attack carried out by the communication. Examples include VIPs, assistants, employees, and external recipients such as vendors, contractors, and the like. In some embodiments, this facet may further identify the group or department under attack (e.g., the accounting department, human resources department, etc.).

Attack Goal: This facet indicates the goal of the attack carried out by the communication. Examples include invoice fraud, payment fraud, credential theft, ransom, malware installation, gift card fraud, and the like.

Attack Vector: This facet indicates how the attack is actually carried out, for example, by specifying whether the risk is posed by text, audio, video, links, or attachments included in the communication. The possibilities will depend on the media available within the channel through which the communication was delivered.

Channel Delivery: This facet indicates whether the attack was delivered via a single channel or multiple channels. For example, this facet may specify whether the attack was in the form of a message with a phishing link or whether the attack was in the form of a message from a compromised account that urges the recipient to follow instructions in an illegitimate (e.g., spoofed) email. As another example, this facet may specify whether the attack was in the form of a vocal spoof, delivered over via a communication platform, that requests the recipient to further communicate with a compromised account.

Using ML models, the threat detection platform can classify each communication across some or all of these facets in order to better understand the threat posed by those communications.

Detecting and Remediating Attacks

Figure 4:
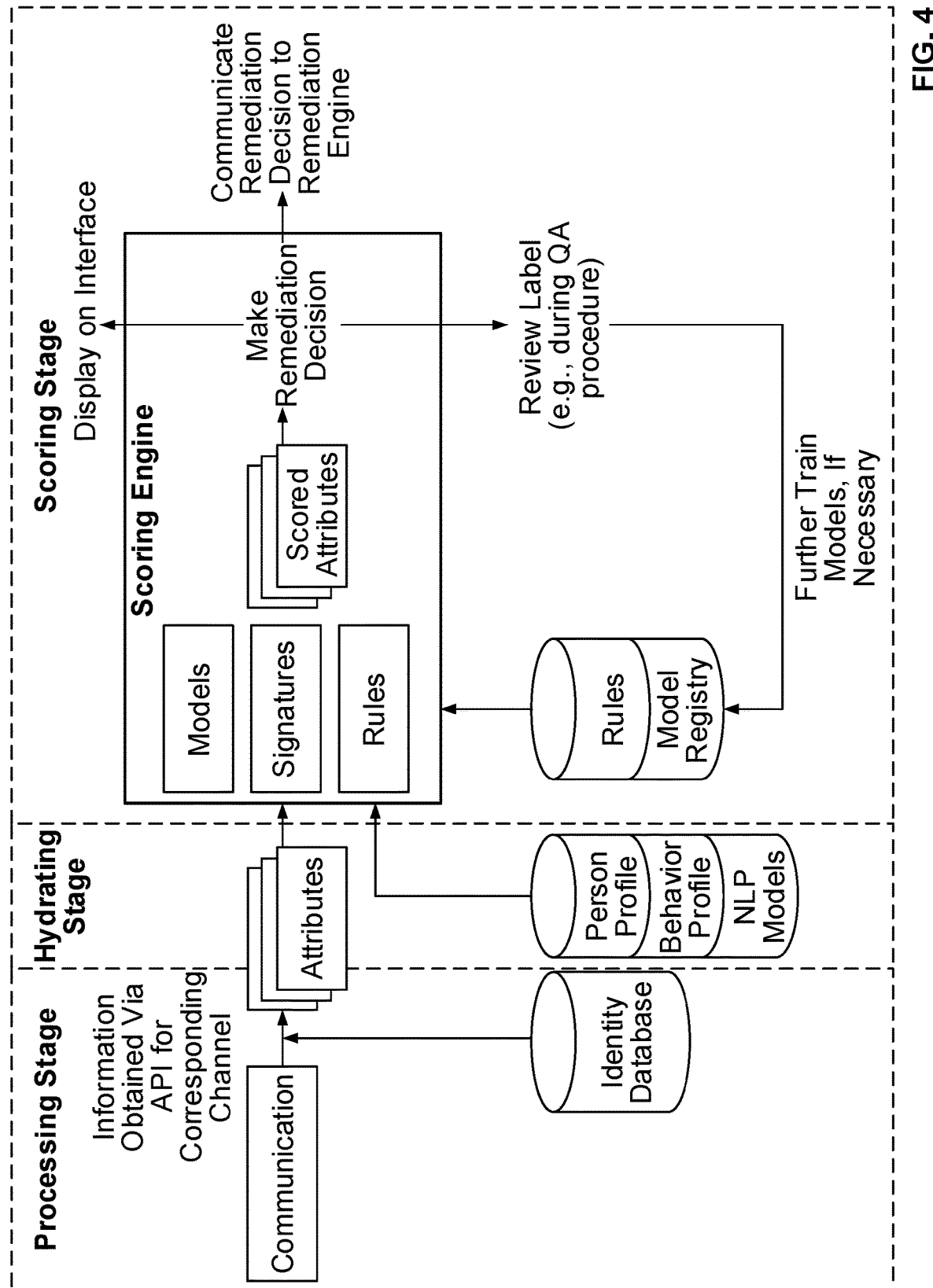
FIG. 4 includes a high-level illustration of a process for scoring communications so as to quantify the threat of those communications.

To detect and then classify an attack, the threat detection platform may employ a scoring engine that is able to work in concert with the remediation engine (e.g., remediation engine 212 of FIG. 2) to address threats. This scoring engine may be able to examine communications in near real time in order to limit or prevent the damage of attacks. FIG. 4 includes a high-level illustration of a process for scoring communications so as to quantify the threat of those communications.

Initially, the threat detection platform will subscribe to new communications on a given channel. For example, the threat detection platform may establish a connection with an API associated with the given channel in order to obtain information regarding the communications exchanged via the given channel. For each new communication, the threat detection platform may resolve the identity of the recipient based on, for example, the account to which the communication is addressed. Then, the threat detection platform can extract attributes of the communication. Attributes may be established based on an analysis of the communication itself or its accompanying metadata. Examples of attributes include time of transmission, geographical origin, sender identity, sender account identifier (e.g., email address or phone number), recipient identity, recipient account identifier, subject, body content, presence or content of attachments, etc.

As shown in FIG. 4, the threat detection platform may "hydrate" these attributes with features from the person and behavior profiles associated with the account responsible for transmitting the communication. In some embodiments, the threat detection platform further hydrates these attributes with features from other auxiliary datasets. For example, the threat detection platform may supplement the attributes with insights derived by Natural Language Processing (NLP) models, or the threat detection platform may supplement the attributes with insights gained through analysis of recent sign-in events.

Thereafter, the scoring engine can be applied to these data to produce a score that is indicative of the potential risk of the communication. Further information on scoring can be found in U.S. application Ser. No. 17/094,801, titled "Discovering Email Account Compromise Through Assessments of Digital Activities," which is incorporated by reference herein in its entirety. The scoring engine can then determine whether the communication should be remediated based on a comparison of the score to a threshold. If the scoring engine determines that remediation is not necessary, then no further action may be performed with respect to the communication and the communication may simply be allowed to proceed to its intended destination. However, if the scoring engine determines that remediation is necessary, then the scoring engine can communicate the decision to the remediation engine. The remediation engine may be responsible for implementing the appropriate remediation actions. For example, the remediation engine may place, via the API, a call to the channel from which the communication originates to prompt performance of a remediation action. Moreover, the scoring engine may cause display of a notification that specifies how the determination was made. The notification may be representative of an explanation that indicates why the communication was determined to be malicious. The notification may include, among other things, the attributes and facets of the communication.

In some embodiments, the decision may also be manually reviewed during a quality assurance (QA) procedure in order to ensure that predictions rendered by the threat detection platform (and, more specifically, the scoring engine) are appropriate. Any insights gained from the manual review may be used for further training of the various models employed during the processing, hydrating, or scoring stages.

Figure 5:
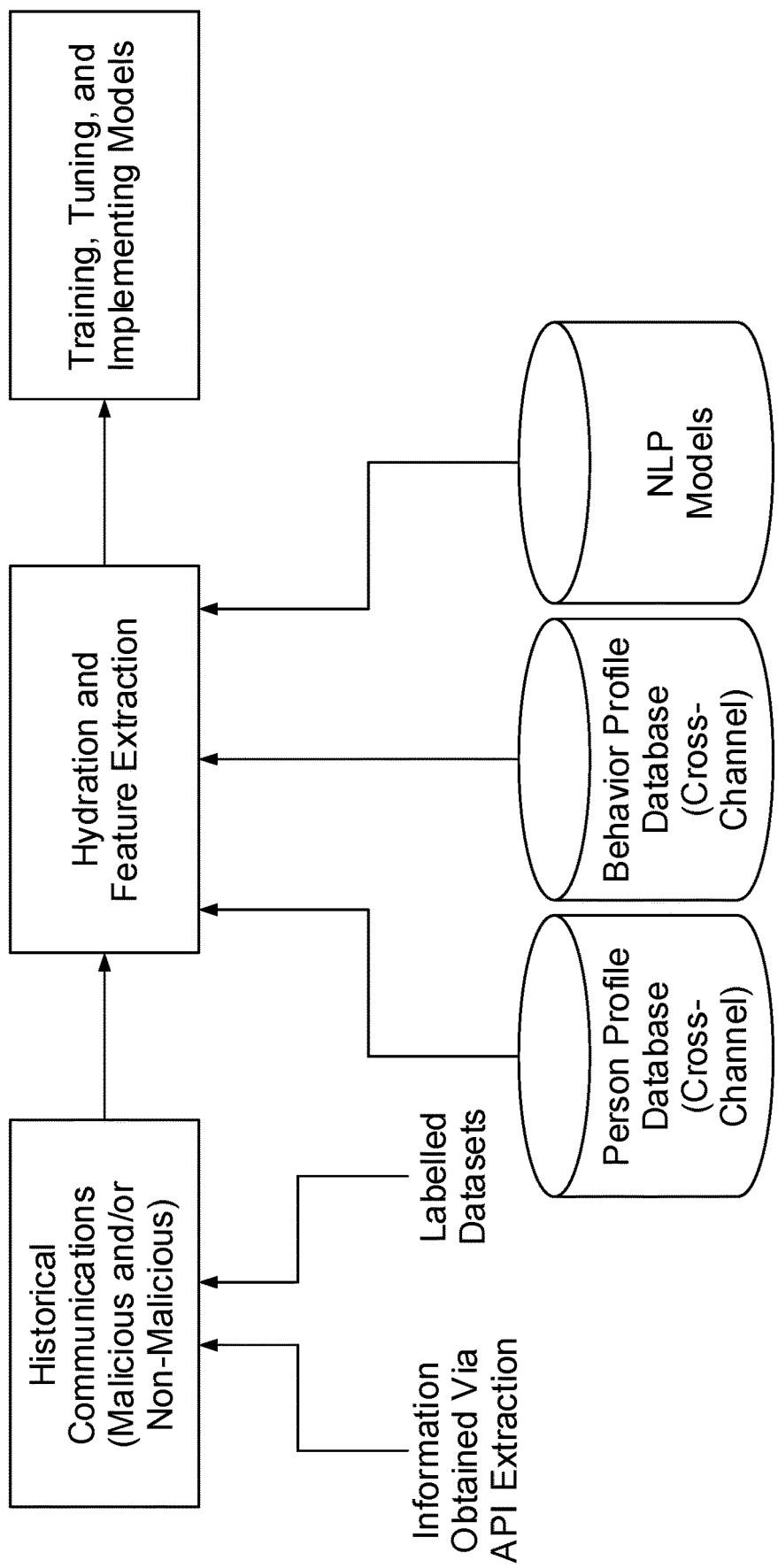
FIG. 5 includes a high-level illustration of a process for building models to be used to detect attacks using historical examples of communications across one or more channels.

FIG. 5 includes a high-level illustration of a process for building models to be used to detect attacks using historical examples of communications across one or more channels. These examples of communications may be labelled (e.g., as malicious or non-malicious) or unlabelled. For each historical example of a communication—whether labelled or unlabelled—the threat detection platform can extract, derive, or otherwise establish attributes and then hydrate these attributes with additional information. This additional information may come from person profiles, behavior profiles, or NLP models. Then, the attributes and additional information can be provided, as input, to a model that is trained and tuned to predict whether the communication is malicious or non-malicious. The model may be associated with a particular type of attack. Accordingly, the model may be one of multiple models to which the attributes and additional information are provided as insight if the threat detection platform is interested in establishing whether the communication is representative of more than one type of attack.

Monitoring and Remediating Account Compromise Across Multiple Channels

Figure 6:
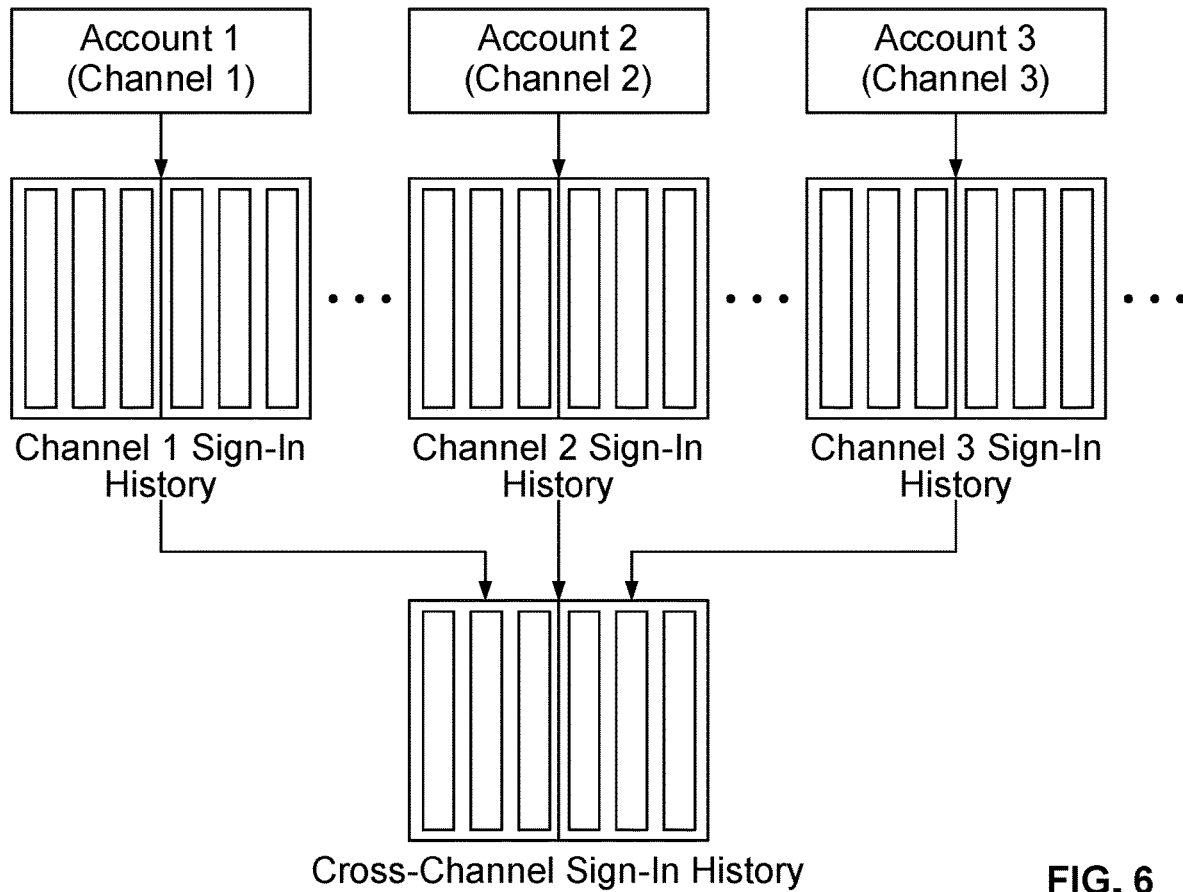
FIG. 6 includes a high-level illustration of a process for independently generating histories of sign-in events for different accounts associated with different channels, and then combining the histories into a record for the individual associated with those different accounts.

For each channel, the threat detection platform may build and then maintain a personalized history of sign-in events by an account as part of its person profile, as well as other account-specific behaviors that are relevant to detecting instances of account compromise (also referred to as "account takeover"). The history of sign-in events maintained for each channel may be broken up into sessions that are representative of intervals of time. Within each session, sign-in events may be recorded with relevant information. Examples of relevant information include the time, geographical location, IP address, and the like. These sessions can then be merged into a cross-channel record of sign-in activity that is part of the person profile. FIG. 6 includes a high-level illustration of a process for independently generating histories of sign-in events for different accounts associated with different channels, and then combining the histories into a record for the individual associated with those different accounts.

Figure 7:
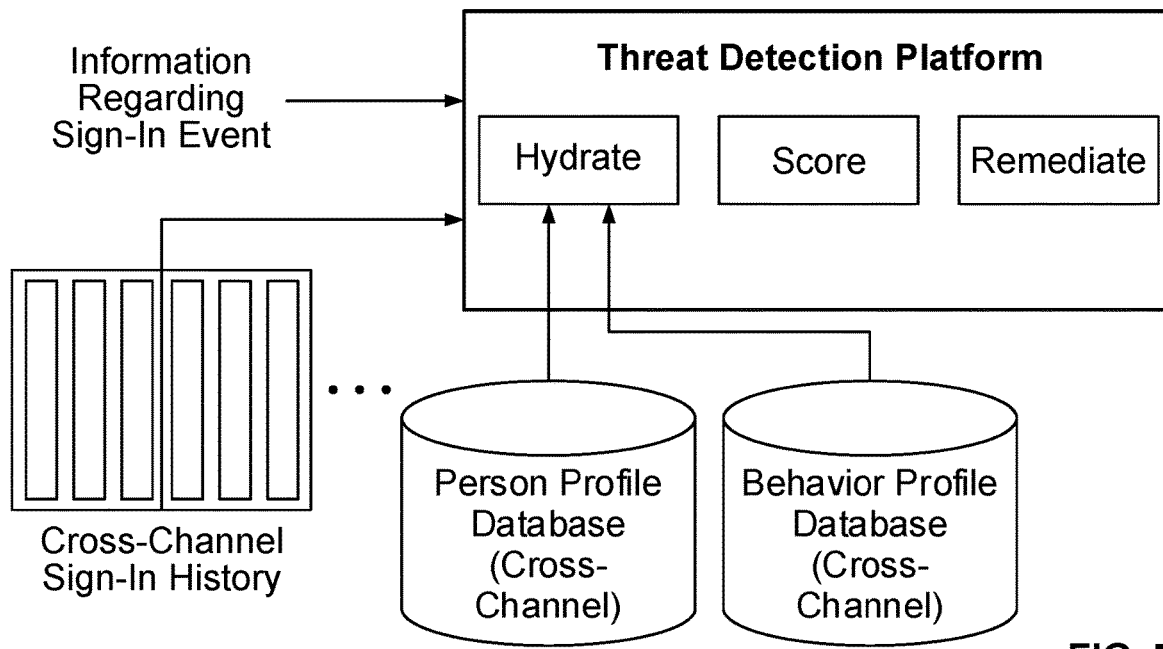
FIG. 7 includes a high-level illustration of a process for producing scores for sign-in events that indicate the degree of similarity to past sign-in events.

After the threat detection platform has built up histories of sign-in events, the scoring engine can compare sign-in events with a given account associated with a given individual against past sign-in events. FIG. 7 includes a high-level illustration of a process for producing scores for sign-in events that indicate the degree of similarity to past sign-in events. These past sign-in events may have been performed with the given account, or these past sign-in events may have been performed by the given individual (e.g., on another channel with another account). In sum, the scoring engine may score current sign-in events against past sign-in events, including auxiliary information such as:

Profiles of normal behavior with respect to sign-in events performed by the given individual across all channels (e.g., as determined based on IP address, geographical location, browser, application version, device identifier, etc.);

Suspicious behaviors discovered through threat detection (e.g., information regarding suspicious communications transmitted by any account associated with the given individual on any channel); and Compromise signals that indicate the given account may be compromised. Examples of compromise signals include sign-in events involving unusual geographical locations, unusual IP addresses, unusual timing, etc.

Models employed by the threat detection platform can use this data to produce a prediction regarding the likelihood that the given account has been taken over. As mentioned above, the prediction may be in the form of a score that can be readily compared against a threshold. If the threat detection platform determines that the given account is likely compromised, then the threat detection platform can either perform or prompt performance of one or more remediation actions. For example, the threat detection platform could initiate a password reset across all channels for which the given individual has an account, or the threat detection platform could generate a notification upon discovering that an unusual sign-in event has occurred. This notification could be transmitted to a member of an IT department of an enterprise that employs the given individual.

Figure 8:
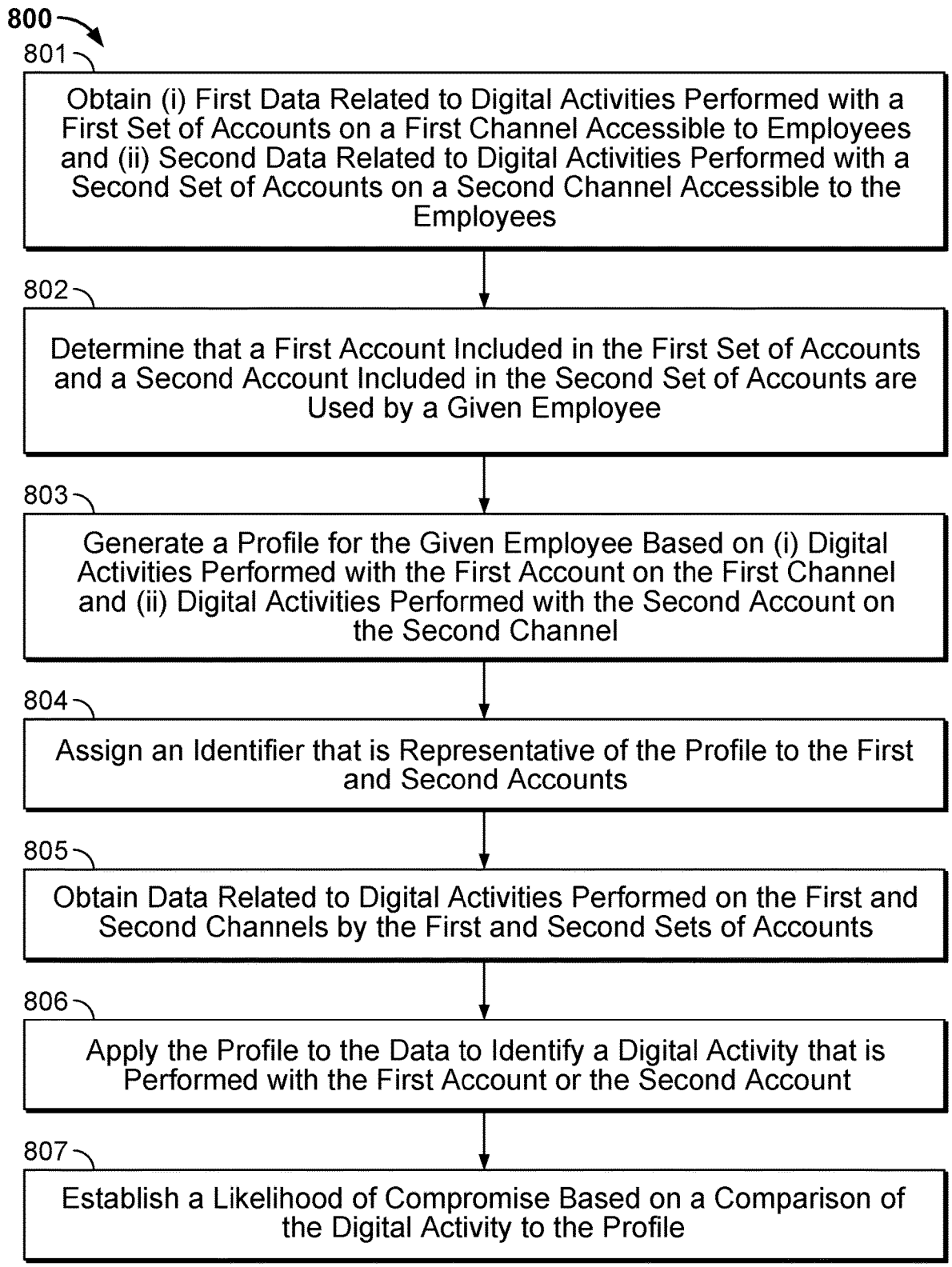
FIG. 8 includes a flow diagram of a process for discovering compromise across multiple channels used by employees of an enterprise to communicate.

FIG. 8 includes a flow diagram of a process 800 for discovering compromise across multiple channels used by employees of an enterprise to communicate. While the process 800 is described in the context of two channels for the purpose of illustration, those skilled in the art will recognize that the process 800 is similarly applicable regardless of the number of channels being monitored.

Initially, a threat detection platform will obtain (i) first data related to digital activities performed with a first set of accounts on a first channel that is accessible to employees of an enterprise and (ii) second data related to digital activities performed with a second set of accounts on a second channel that is accessible to the employees (step 801). As discussed above, the digital activities could include transmissions of messages, receipts of messages, occurrences of sign-in events, creations of mail filters, and the like. In some embodiments, the first and second data are obtained responsive to receiving input indicative of an approval from an administrator associated with the enterprise to access that data.

The first and second data may be obtained from separate datastores. For example, the threat detection platform may establish, via a first API, a connection with a first datastore that is associated with the first channel and then download, from the first datastore via the first API, the first data into a local processing environment. The first datastore may be managed by an entity that supports a collaboration suite used by the employees to exchange emails. Examples of collaboration suites include Microsoft Office 365 and Google Workspace. Similarly, the threat detection platform may establish, via a second API, a connection with a second datastore that is associated with the second channel and then download, from the second datastore via the second API, the second data into the local processing environment. The second datastore may be managed by an entity that supports a communication platform used by the employees to exchange messages. Examples of communication platforms include Slack, Microsoft Teams, and Google Chat.

Then, the threat detection platform may determine that a first account included in the first set of accounts and a second account included in the second set of accounts are used by a given employee (step 802). This can be accomplished by generating a profile for each employee based on her conduct across the first and second channels (step 803), as discussed above. More specifically, the threat detection platform may produce a person profile and a behavioral profile for each employee on each channel. Then, the threat detection platform can combine the profiles in order to create a cross-channel person profile and a cross-channel behavioral profile for each employee.

In some embodiments, the threat detection platform assigns an identifier that is representative of the profile to the first and second accounts (step 804). At a high level, the identifier may serve to indicate that the first and second accounts have been determined to be associated with the same person. In some embodiments, the identifier is a deterministic identifier that is assigned to the first and second accounts based on identifiable information included in the first and second data. In other embodiments, the identifier is a probabilistic identifier that is assigned to the first and second accounts based on signals included in the first and second data that are indicative of similar behavior.

Thereafter, the threat detection platform may obtain, in real time, data that is related to digital activities performed on the first and second channels by the first and second sets of accounts (step 805). In essence, the threat detection platform may obtain (e.g., via the first API) a first stream of data as digital activities are performed on the first channel and obtain (e.g., via the second API) a second stream of data as digital activities are performed on the second channel. The threat detection platform can then apply the profile to the data in order to identify a digital activity that is performed with the first account or the second account (step 806). Said another way, the threat detection platform can apply the profile to identify a digital activity that has been performed with one of the accounts associated with the given employee.

Moreover, the threat detection platform may establish a likelihood of compromise based on a comparison of the digital activity to the profile (step 807). If the digital activity is performed with the first account, then the digital activity may be compared to the digital activities performed with the first account on the first channel in the past. If the digital activity is performed with the second account, then the digital activity may be compared to the digital activities performed with the second account on the second channel in the past. By comparing the digital activity to the profile, the threat detection platform is able to establish the degree to which performance of the digital activity deviates from past digital activities performed on that channel.

Figure 9:
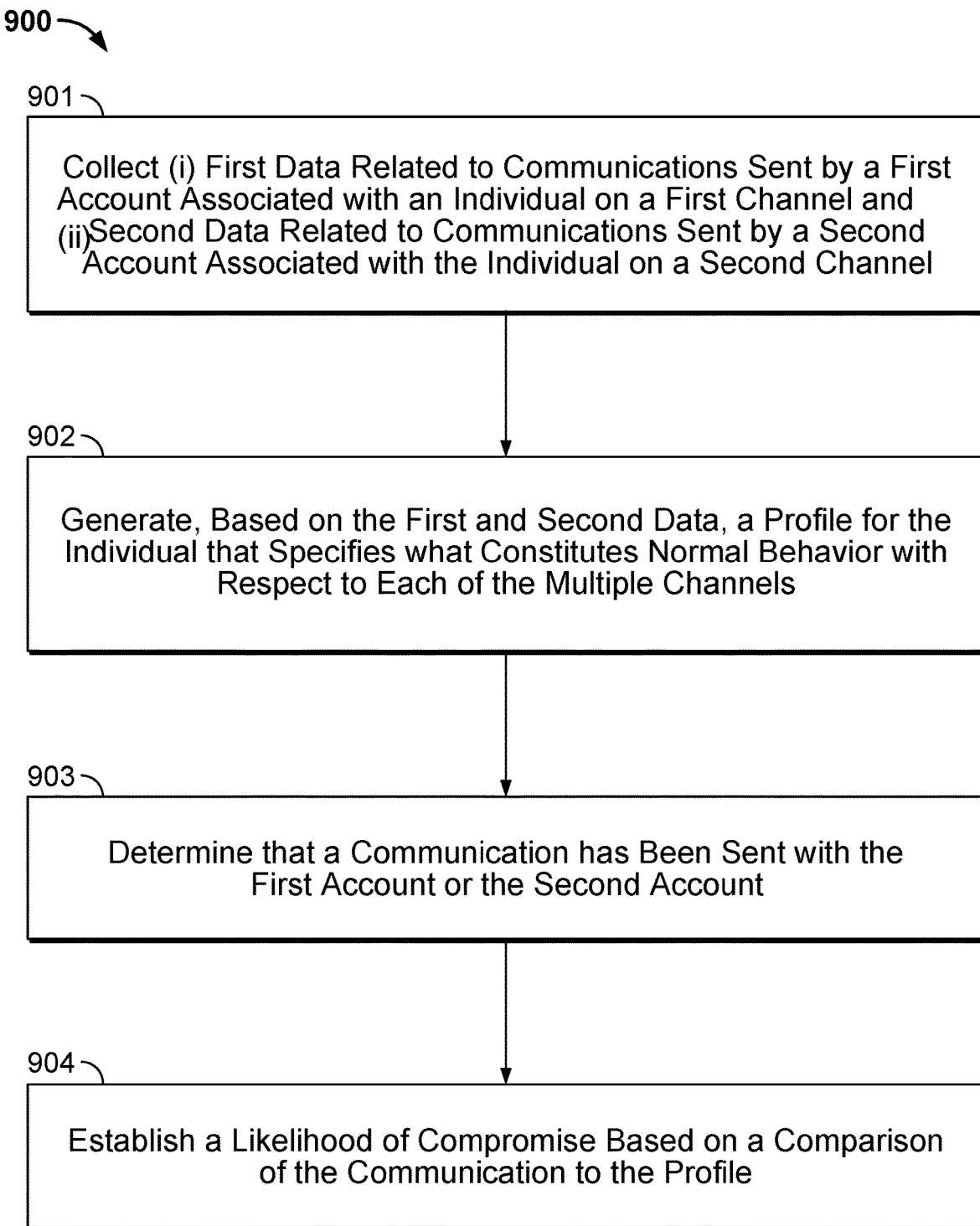
FIG. 9 includes a flow diagram of a process for discovering instances of compromise across multiple channels.

FIG. 9 includes a flow diagram of a process 900 for discovering instances of compromise across multiple channels. Initially, a threat detection platform can collect (i) first data related to communications sent by a first account associated with an individual on a first channel over a first interval of time and (ii) second data related to communications sent by a second account associated with the individual on a second channel over a second interval of time (step 901). Step 901 of FIG. 9 may be similar to step 801 of FIG. 8. The first data may be collected from a first datastore that is managed by a first entity that supports a collaboration suite used by the individual, while the second data may be collected from a second datastore that is managed by a second entity that supports a communication platform used by the individual.

In some embodiments, the first interval of time is identical to the second interval of time. For example, the first and second data may pertain to communications sent on the first and second channels over the last three, six, or nine months. In other embodiments, the first interval of time has a different start point and/or end point than the second interval of time. Thus, the first interval of time could be longer or shorter than the second interval of time.

Then, the threat detection platform can generate a profile for the employee based on the first and second data (step 902). Step 902 of FIG. 9 may be similar to step 803 of FIG. 8. At a high level, the profile may specify what constitutes normal behavior of the employee with respect to the first and second channels. As an example, assume that the first channel is representative of an email channel supported by a collaboration suite while the second channel is representative of a chat channel supported by a communication platform. In such a scenario, the profile may include (i) a first pair of profiles developed for the collaboration suite based on the first data and (ii) a second pair of profiles developed for the communication platform based on the second data. Each pair of profiles may include a person profile and a behavior profile, as discussed above. The person profile may include information regarding the individual that is extracted or derived from the first data or the second data. Meanwhile, the behavior profile may identify other individuals with whom the individual has communicated over the first channel or the second channel.

Thereafter, the threat detection platform may determine that a communication has been sent with the first account of the second account (step 903). This may occur in real time if data regarding communications sent on the first and second channels is provided by, or retrieved from, respective datastores via respective APIs. With the profile, the threat detection platform can establish the risk posed by communications sent by the individual on the first and second channels. Thus, the threat detection platform can establish a likelihood of compromise based on a comparison of the communication to the profile (step 904). By comparing the communication to the profile, the threat detection platform can establish how much the communication deviates from past communications sent by that account in terms of content or context.

Figure 10:
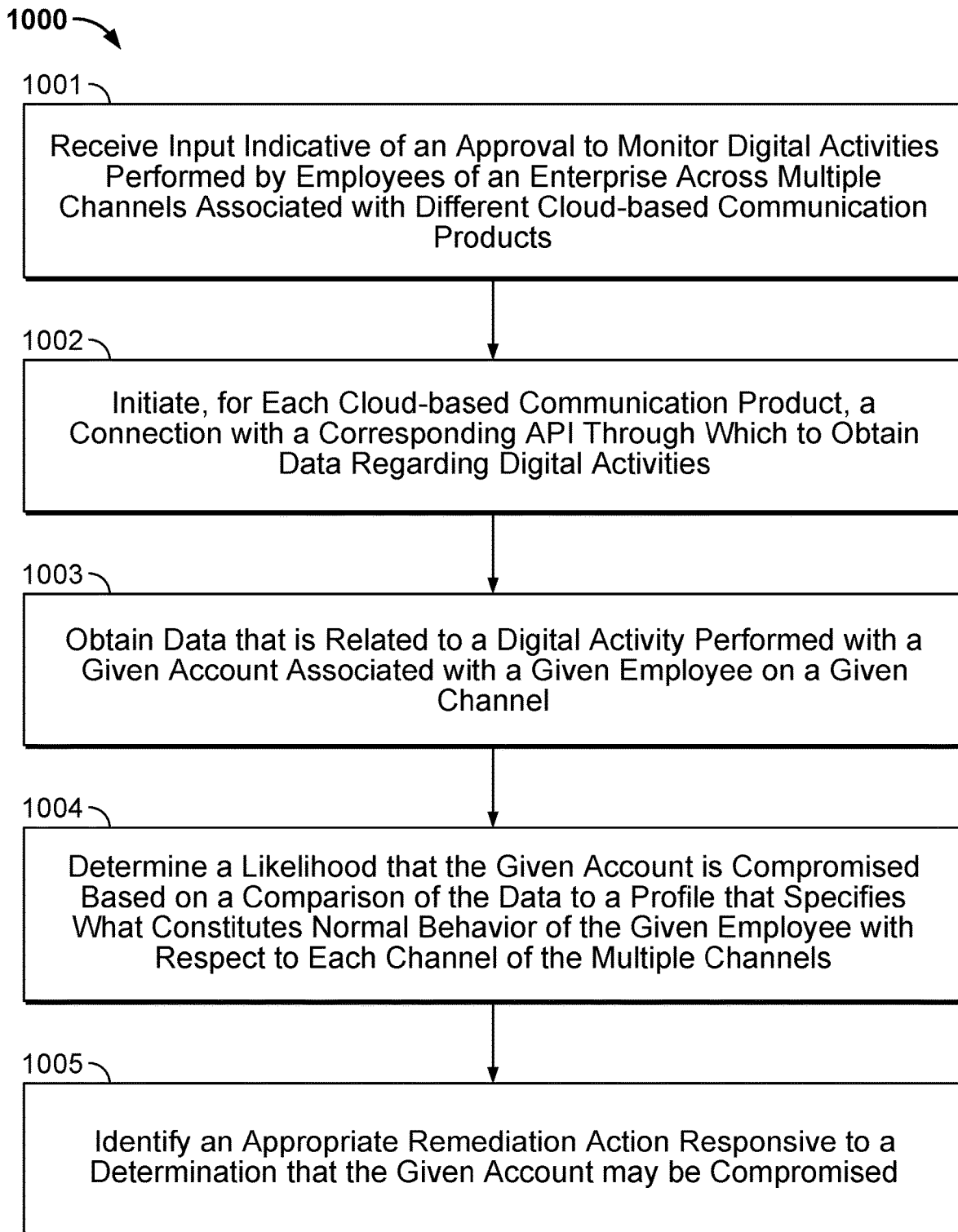
FIG. 10 includes a flow diagram of a process for monitoring threats across multiple cloud-based communication products that are accessible to employees of an enterprise.

FIG. 10 includes a flow diagram of a process 1000 for monitoring threats across multiple cloud-based communication products that are accessible to employees of an enterprise. The term "cloud-based communication product" may refer to collaboration suites, communication platforms, and other products that offer text (e.g., in the form of emails or messages), audio, or video services.

Initially, a threat detection platform can receive input indicative of an approval to monitor digital activities performed by employees of an enterprise across multiple channels (step 1001). Each channel of the multiple channels may be associated with a different cloud-based communication product that is accessible to the employees.

For each cloud-based communication product, the threat detection platform can then initiate a connection with a corresponding API through which to obtain data regarding digital activities performed with accounts associated with that cloud-based communication product (step 1002). Through these APIs, the threat detection platform can obtain data related to digital activities that are performed using those cloud-based communication products. Note, however, that each cloud-based communication product is normally associated with a different set of accounts. For example, employees of an enterprise may be associated with a first set of accounts for a first cloud-based communication product, a second set of accounts for a second cloud-based communication product, etc. These accounts can be "stitched" together by the threat detection platform, however. Thus, the threat detection platform may understand that a first account for a first cloud-based communication product is associated with the same employee as a second account for a second cloud-based communication product, even though the first and second accounts are not directly related to one another.

Thereafter, the threat detection platform may obtain data that is related to a digital activity performed with a given account associated with a given employee on one of the multiple channels (step 1003). In some embodiments, the threat detection platform may resolve the identity of the given employee based on an analysis of the data. For example, the threat detection platform may examine the data to identify the given account and then the threat detection platform may acquire a profile is associated with the given account. As discussed above, the profile may include a separate behavior profile for each cloud-based communication product that can be used to identify deviations in content or context of digital activities performed with that cloud-based communication product that are representative of changes in behavior. As an example, each behavior profile may specify the other employees with whom the given employee has communicated using the corresponding cloud-based communication product.

To establish the likelihood of compromise of the given account, the threat detection platform can compare the data to the profile that specifies what constitutes normal behavior of the given employee with respect to each channel of the multiple channels (step 1004). The nature of the comparison will depend on the type of digital activity that was performed. For example, if the digital activity is the transmission of a communication by the given account to another account associated with another employee, then the likelihood of compromise may be based on the frequency with which the given employee has communicated with the other employee in the past, as determined from the profile. Additionally or alternatively, the likelihood of compromise may be based on whether a topic of the communication is similar to topics of past communications exchanged between the given employee and other employee. At a high level, the profile allows the threat detection platform to establish whether the digital activity deviates—in content or context—from similar digital activities that were performed with the given account in the past.

Moreover, the threat detection platform can identify an appropriate remediation action responsive to a determination that the given account may be compromised (step 1005). The threat detection platform may perform the remediation action itself, or the threat detection platform may cause performance of the remediation action. As an example, the threat detection platform may transmit (e.g., via an API) an instruction to a cloud-based communication product to initiate a password reset, restrict access to sensitive information, prevent performance of further digital activities, etc. In some embodiments, steps 1003-1005 are performed by the threat detection platform in real time as the digital activity is performed to ensure that the remediation action is performed promptly so as to limit harm to the enterprise. This may be possible if data regarding digital activities is streamed from the cloud-based communication products to the threat detection platform, for example, via respective APIs.

While the process 1000 has been described in the context of establishing the threat posed by a single account based on a single digital activity, those skilled in the art will recognize that the threat detection platform may perform the process 1000 for each digital activity performed with one of the cloud-based communication products being monitored. Thus, the threat detection platform may sequentially or simultaneously complete multiple iterations of the process 1000 as digital activities are performed by employees across different cloud-based communication products.

FIG. 11 includes a flow diagram of a process 1100 for performing cross-channel threat detection on behalf of an enterprise. Initially, a threat detection platform can obtain (i) first data associated with communications sent on a first channel with a first set of accounts associated with employees of the enterprise and (ii) second data associated with communications sent on a second channel with a second set of accounts associated with the employees (step 1101). Step 1101 of FIG. 11 may be similar to steps 801 and 901 of FIGS. 8 and 9, respectively. Thus, the threat detection platform may establish a connection with a first API through which the first data can be obtained from a first datastore. Moreover, the threat detection platform may establish a connection with a second API through which the second data can be obtained from a second datastore, The first and second datastores may be managed by different entities (e.g., that support different cloud-based communication products).

Then, for each communication sent on the first and second channels, the threat detection platform can determine a likelihood that a corresponding account from which the communication originates is compromised (step 1102). More specifically, the threat detection platform can compare each communication to a profile that is associated with the account from which the communication originates. This profile may be representative of a historical model of behavior of the account across the first and second channels. Accordingly, the threat detection platform may be able to establish the degree of similarity between a given communication and past communications sent by the same account using the corresponding profile.

Assume, for example, that the threat detection platform is tasked with ascertaining the threat posed by a given communication sent by a given account. In such a scenario, the threat detection platform could identify the intended recipient of the given communication and then compare the intended recipient to the profile associated with the given account so as to determine this activity represents a deviation in behavior. Similarly, the threat detection could determine whether the combination of intended recipient and topic of the given communication represents a deviation in behavior by the given account.

Unless contrary to possibility, these steps could be performed in various sequences and combinations. For example, a threat detection platform may continually perform the processes of FIG. 8, 9, 10, or 11 such that profiles are constantly being created, updated, and employed to detect threats across different channels. Other steps could also be included in some embodiments.

Illustrative Examples of Interfaces for Conveying Information Regarding Threats

A threat detection platform may be responsible for monitoring the digital activities performed with different sets of accounts across multiple channels in order to detect threats to the security of an enterprise. For the purpose of illustration, embodiments may be described in the context of transmitting communications such as emails or messages. However, the technology is similarly applicable to other types of digital activities and channels unless stated otherwise. For example, the technology could be applied to audio- or video-based communications instead of, or in addition to, text-based communications.

As shown in FIGS. 12A-B, when an individual accesses the threat log produced for an enterprise, a breakdown of the different channels that are being monitored may be shown. In FIGS. 12A-B, for example, the threat detection platform is providing information regarding threats discovered in emails delivered by Microsoft Outlook, messages delivered by Microsoft Team, and messages delivered by Slack. This breakdown enables the individual to readily observe where threats originate.

When the individual selects a channel, a summary of the threats found within that channel may be shown. In FIG. 12A, the individual has selected Microsoft Outlook in the navigation bar beneath the breakdown. The summary may include information on the threats discovered by the threat detection platform, such as the source (e.g., sender address), destination (e.g., recipient address), type, etc. The information may include indicators of compromise, such as classifications indicating the type of threat, as well as indicators of engagement. In some embodiments, the summary specifies whether any remediation actions were performed to address the threat. Additionally or alternatively, the summary may permit the individual to specify what type of remediation actions should be performed for a given threat or what type of remediation actions should be performed for similar threats in the future. As shown in FIG. 12B, the individual may be able to filter the threats by type, characteristic, etc. Here, for example, the individual has selected Microsoft Teams as the channel and then opted to review messages that have been determined to include a suspicious link.

Upon selecting a threat that is shown in the summary, the individual may be directed to an interface with further information related to the threat. FIG. 12C depicts an example of such an interface. On the interface, the threat detection platform may present some insights into why the corresponding digital activity was flagged as a potential threat. Here, the individual has selected the last entry in the summary shown in FIG. 12A, and the threat detection platform has shown information that indicates an email with "Business Essentials Expired" in the subject line was determined to be a possible instance of impersonation due to atypical contact, urgent financial request, and possible executive impersonation. Moreover, the threat detection platform has posted content of the email to show that a suspicious link was included in the body.

When characterizing a possible threat, the threat detection platform may consider the following:
- How was the attack staged (i.e., what was the attack vector)? Examples include email to channel, message to channel, and independent chats to individuals (which are not accessible via API).
- Who was the conduit (i.e., who was the attack actor)? Examples include internal compromised accounts and internal accidental actions (e.g., forwarding a malicious communication).
- What was the delivery mechanism (i.e., what was the attack missile)? Examples include URLs, attachments in communications, and uploaded files via links.
- What was the malicious delivery (i.e., what was the attack payload)? Examples include malicious landing pages and malware.

Figure 12D:
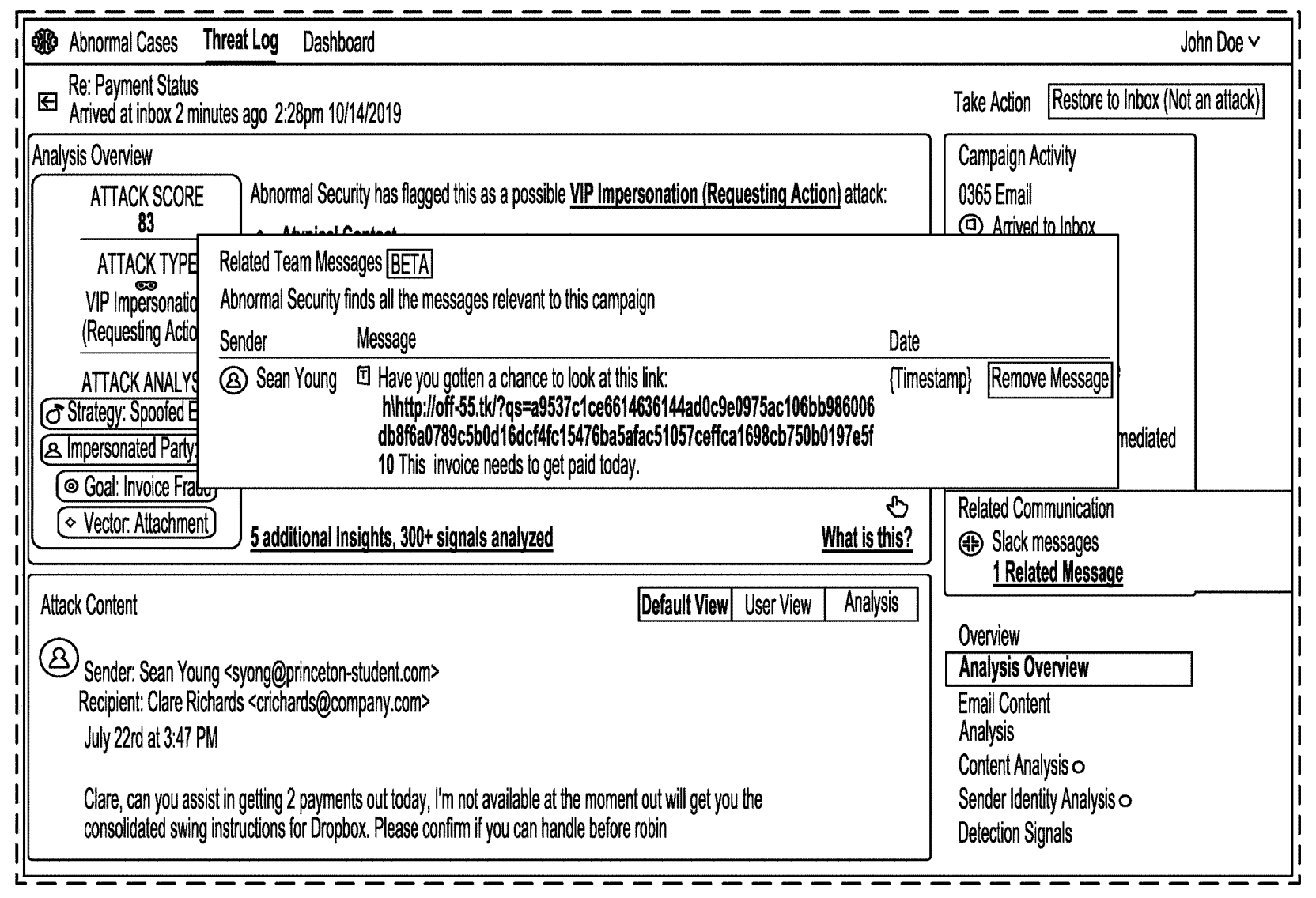

On the interface, the individual may be shown information related to the campaign of which the email was determined to be a part. Generally, these other communications are determined to be part of the campaign due to a shared indicator of compromise. Here, the threat detection platform has determined that similar emails were received by seven recipients. One of these recipients forwarded the email, while two of these recipients replied to the email. Note that the threat detection platform has also determined a message transmitted via Slack may be related to the campaign. This type of insight—which can gained through analysis of data obtained from multiple channels—is simply not possible with conventional security products. The individual may learn additional context of these communications by interacting with the related information. For instance, upon receiving input indicative of a selection of "Slack Messages," the threat detection platform may post information related to the message as shown in FIG. 12D. Here, the threat detection platform has determined that the message is likely related to the campaign because it asks whether the recipient has had an opportunity to review the email at issue.

In some embodiments, the interface includes a graphical element that enables the individual to specify what action, if any, should be taken by the threat detection platform. For example, if the individual determines that a message delivered via Slack is likely malicious, then the individual may instruct the threat detection platform to post a message in a Slack channel that specifies the malicious nature of the message. As another example, if the individual determines that an email is not malicious, then the individual may instruct the threat detection platform to restore the email to its intended destination.

Figure 13:
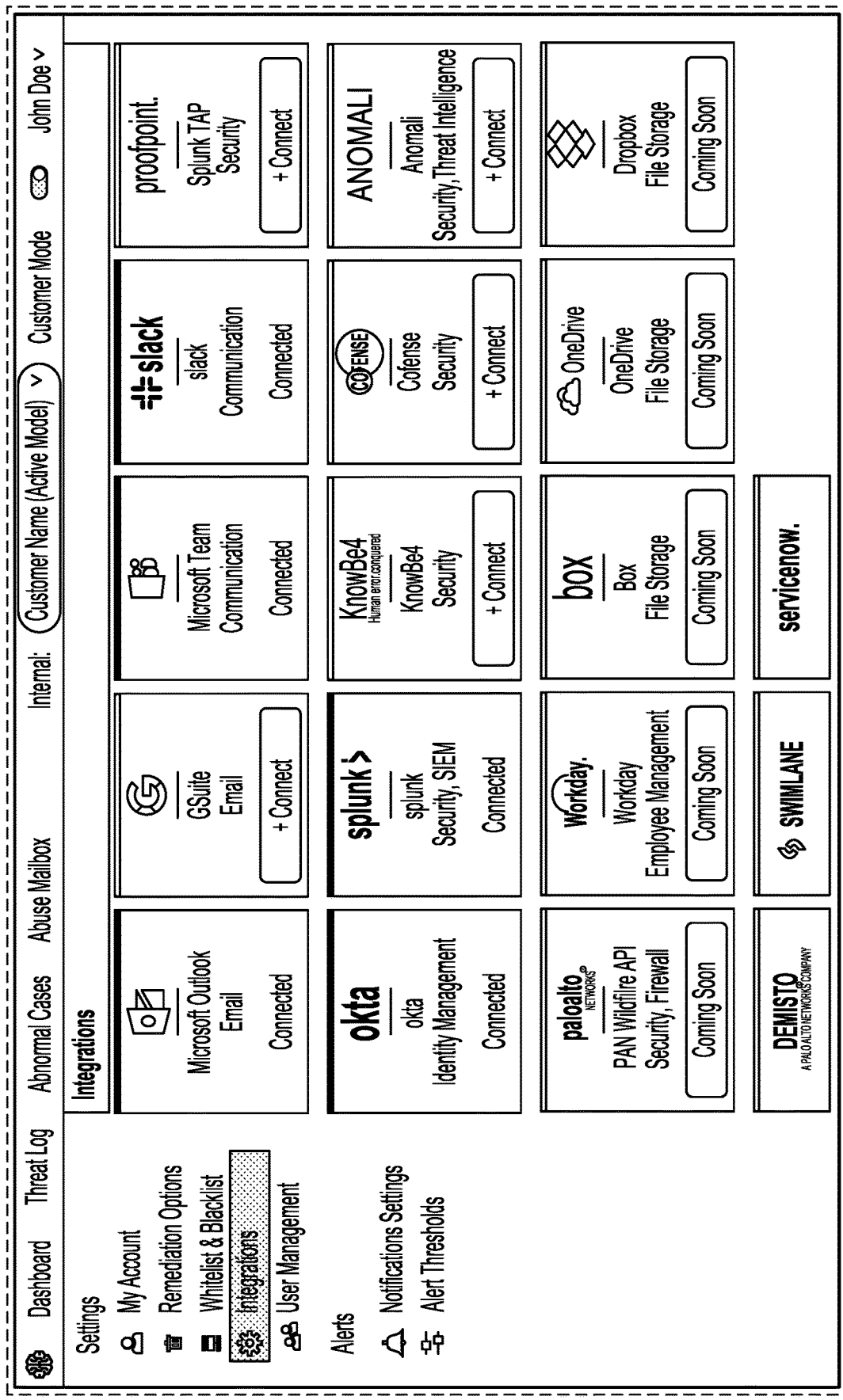
FIG. 13 depicts an example of an integration page through which an individual may integrate a threat detection platform with third-party services.

If the individual is interested in incorporating additional channels of communication, she can simply connect them through the threat log shown in FIG. 12A. Upon selecting the option to add a new channel, the individual may be directed to an integration page as shown in FIG. 13. From the integration page, the individual can browse the available channels and then connect them to the threat detection platform. As discussed above, the threat detection platform may obtain data regarding digital activities performed on these channels through respective APIs.

FIG. 14 depicts another example of a threat log that includes an engagement column. As mentioned above, the engagement column may specify the nature of employee interactions with a malicious communication that represents a potential threat. This information may be useful in the context of determining how to prioritize and then address potential threats. For example, an enterprise may want to address malicious emails that appear to be effective in engaging recipients before addressing malicious emails that are ineffective in engaging recipients.

Figure 15:
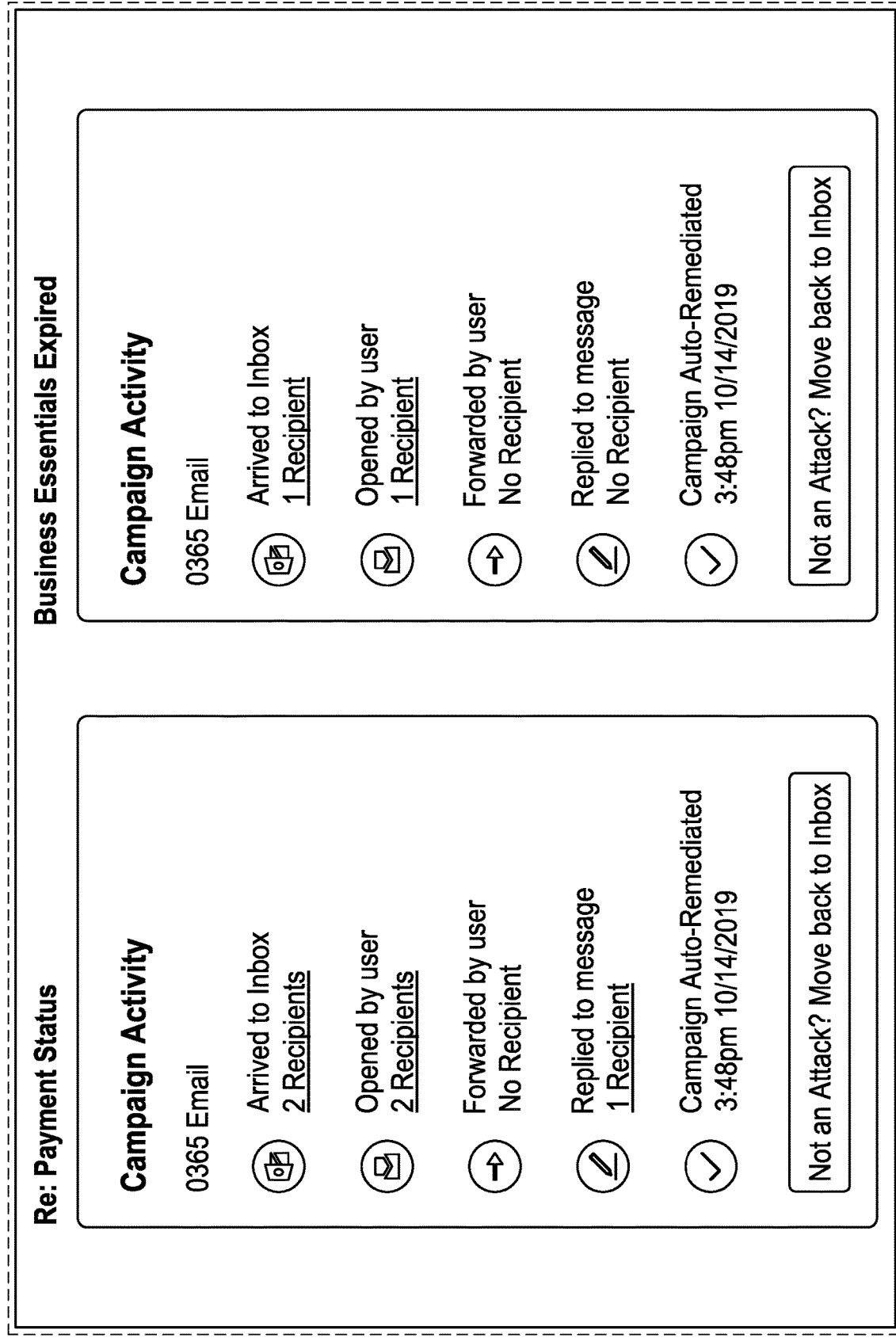
FIG. 15 depicts several examples of campaign activity panels for possible threats.

FIG. 15 depicts several examples of campaign activity panels for possible threats. Additional information may be available for further review upon interacting with the campaign activity panels. For example, the threat detection platform may identify the recipients of the email with the subject line "Re: Payment Status" upon receiving input indicative of a selection of "2 Recipients" beneath "Arrived to Inbox."

Third-Party Service Integration

Enterprises may find it desirable to deploy a threat detection platform in combination with one or more Security Information and Event Management (SIEM) tools supported by security vendors. Generally, these security vendors ensure the SIEM tools are accessible via APIs to enable full integration into the security systems of these enterprises. While the example provided below indicates how the threat detection platform could upload information to Splunk, a similar procedure could be performed to interface with the APIs of other SIEM tools, such as the Proofpoint SIEM API.

To integrate with Splunk Enterprise (also referred to as "Splunk Cloud"), an enterprise can create an application as shown in FIG. 16. Various resources are available on developing Splunk applications. At a high level, the application can take information that is extracted, derived, or otherwise obtained by the threat detection platform and then provide this information to Splunk. For example, an application may be programmed such that it can:

Log when the threat detection platform flags and/or remediates an attack campaign;

Log when the threat detection platform flags an instance of account compromise;

Log when the threat detection platform flags and/or remediates malicious employee-reported communication campaigns; or Log when an attack campaign is marked as a false positive (i.e., marked as an attack despite the communication being safe).

Various attributes of digital activities may be provided to Splunk, including:

For advanced attacks that have been confirmed as suspicious:
Subject;
Attack type;
Received time;
Sender display name and/or sender address;
Recipients;
Campaign size;
Remediation status; and
Link to portal.

For instances of account compromise with a high confidence of suspicion:
Affected employee;
First observed time;
Trigger event; and
Link to portal.

For communications provided to an abuse mailbox that have been confirmed as suspicious:
Attack type;
Received time;
Sender display name and/or sender address;
Recipients;
Campaign size;
Remediation status; and
Link to portal.

By importing this information into Splunk, greater insights can be gained by employers. For example, employers may be able to construct personalized visualizations, as well as make use of existing SIEM tools.

Processing System

Figure 17:
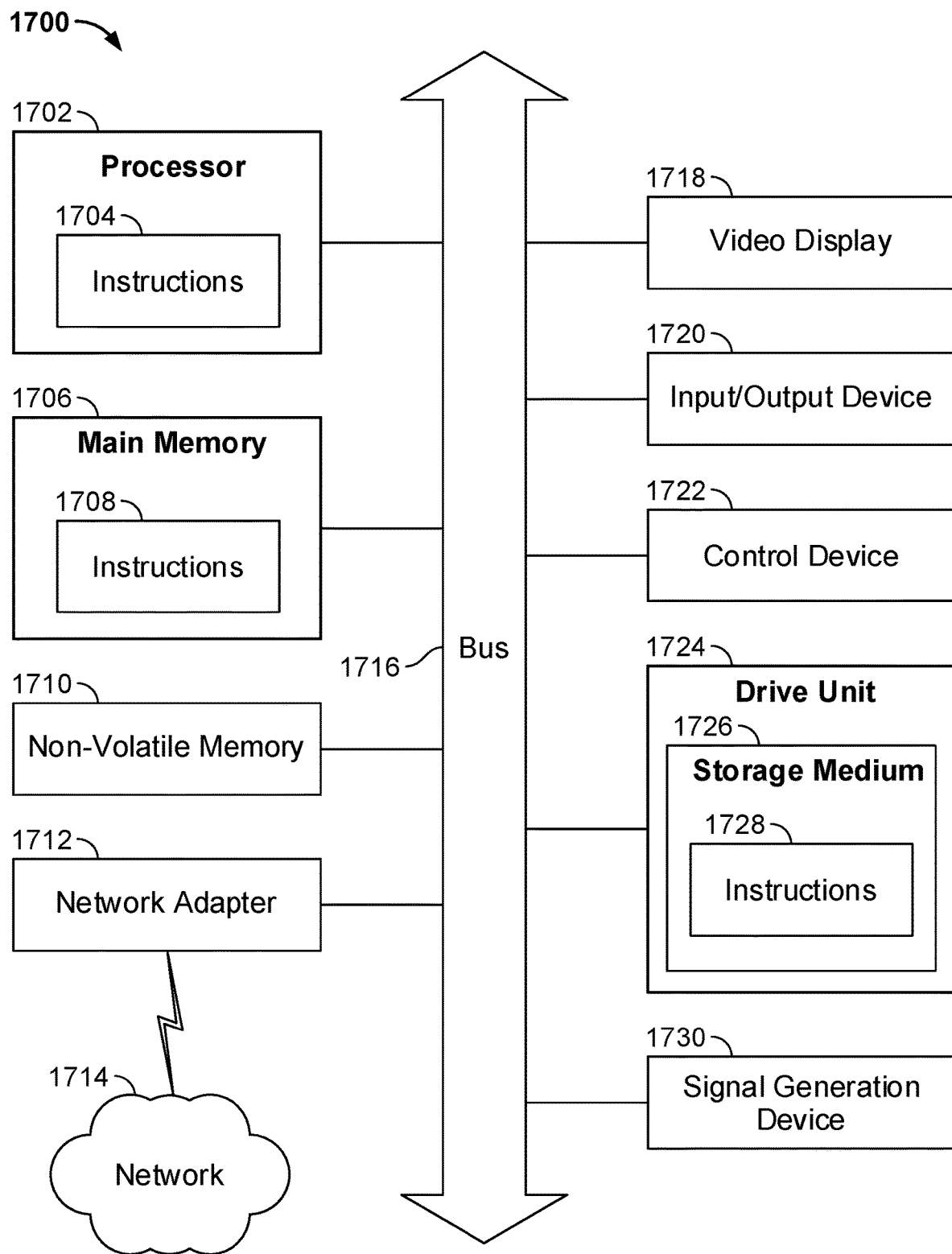
FIG. 17 is a block diagram illustrating an example of a processing system in which at least some operations described herein can be implemented.

FIG. 17 is a block diagram illustrating an example of a processing system 1700 in which at least some operations described herein can be implemented. For example, components of the processing system 1700 may be hosted on a computing device that includes a threat detection platform. As another example, components of the processing system 1700 may be hosted on a computing device that is queried by a threat detection platform to acquire emails, data, etc.

The processing system 1700 may include a central processing unit (also referred to as a "processor") 1702, main memory 1706, non-volatile memory 1710, network adapter 1712 (e.g., a network interface), video display 1718, input/output device 1720, control device 1722 (e.g., a keyboard or pointing device), drive unit 1724 including a storage medium 1726, and signal generation device 1730 that are communicatively connected to a bus 1716. The bus 1716 is illustrated as an abstraction that represents one or more physical buses or point-to-point connections that are connected by appropriate bridges, adapters, or controllers. The bus 1716, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), inter-integrated circuit ($I^2C$) bus, or an Institute of Electrical and Electronics Engineers (IEEE) standard 1394 bus (also referred to as "Firewire").

The processing system 1700 may share a similar processor architecture as that of a desktop computer, tablet computer, mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the processing system 1700.

While the main memory 1706, non-volatile memory 1710, and storage medium 1726 are shown to be a single medium, the terms "machine-readable medium" and "storage medium" should be taken to include a single medium or multiple media (e.g., a centralized/distributed database and/or associated caches and servers) that store one or more sets of instructions 1728. The terms "machine-readable medium" and "storage medium" shall also be taken to include any medium that is capable of storing, encoding, or carrying a set of instructions for execution by the processing system 1700.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 1704, 1708, 1728) set at various times in various memory and storage devices in an electronic device. When read and executed by the processors 1702, the instruction(s) cause the processing system 1700 to perform operations to execute elements involving the various aspects of the present disclosure.

Moreover, while embodiments have been described in the context of fully functioning electronic devices, those skilled in the art will appreciate that some aspects of the technology are capable of being distributed as a program product in a variety of forms. The present disclosure applies regardless of the particular type of machine- or computer-readable media used to effect distribution.

Further examples of machine- and computer-readable media include recordable-type media, such as volatile and non-volatile memory devices 1710, removable disks, hard disk drives, and optical disks (e.g., Compact Disk Read-Only Memory (CD-ROMS) and Digital Versatile Disks (DVDs)), and transmission-type media, such as digital and analog communication links.

The network adapter 1712 enables the processing system 1700 to mediate data in a network 1714 with an entity that is external to the processing system 1700 through any communication protocol supported by the processing system 1700 and the external entity. The network adapter 1712 can include a network adaptor card, a wireless network interface card, a router, an access point, a wireless router, a switch, a multilayer switch, a protocol converter, a gateway, a bridge, a bridge router, a hub, a digital media receiver, a repeater, or any combination thereof.

REMARKS

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A method comprising:
   receiving input indicative of an approval to monitor digital activities performed by employees of an enterprise across multiple channels, wherein each channel of the multiple channels is associated with a different cloud-based communication product accessible to the employees;
   for each cloud-based communication product, initiating a connection with a corresponding application programming interface (API) through which to obtain data regarding digital activities performed with accounts associated with that cloud-based communication product;
   obtaining data that is related to a digital activity performed with a given account associated with a given employee on a given channel, the given channel being one of the multiple channels; and
   determining a likelihood that the given account is compromised based on a comparison of the obtained data to a profile that specifies what constitutes normal behavior of the given employee with respect to each channel of the multiple channels, wherein the profile includes a separate behavior profile for each channel that is able to identify deviations in at least one of: (1) content or (2) context of digital activities performed on that channel that are representative of changes in behavior.

2. The method of claim 1, wherein:
   at least one channel of the multiple channels is associated with a collaboration suite through which the employees are able to send and receive emails; and
   at least one channel of the multiple channels is associated with a communication platform through which the employees are able to send and receive messages.

3. The method of claim 1, wherein each behavior profile specifies other employees with whom the given employee normally communicates on a corresponding channel.

4. The method of claim 1, wherein the digital activity is a transmittal of a communication from the given account to another account associated with another employee, and wherein the likelihood is based on a frequency with which the given employee has communicated with the other employee via the given channel in the past.

5. The method of claim 1, wherein the digital activity is a transmittal of a communication from the given account to another account associated with another employee, and wherein the likelihood is based on whether a topic of the communication is similar to topics of past communications exchanged between the given employee and the other employee via the given channel.

6. The method of claim 1, further comprising resolving an identity of the given employee based on an analysis of the data related to the digital activity.

7. The method of claim 1, wherein the obtained data is related to a sign-in event.

8. The method of claim 1, further comprising identifying an appropriate remediation action responsive to a determination that the given account is compromised.

9. The method of claim 8, wherein said obtaining, said determining, and said identifying are performed in real time as the digital activity is performed.

10. The method of claim 1, further comprising assigning an identifier that is representative of the profile to each respective given account associated with the given employee on respective given channels.

11. The method of claim 10, wherein the identifier is a deterministic identifier that is assigned to the respective given accounts based on identifiable information included in respective first and second data.

12. The method of claim 10, wherein the identifier is a probabilistic identifier that is assigned to the respective given accounts based on signals included in first and second data that are indicative of similar behavior.

13. A system, comprising:
   a processor configured to:
      receive input indicative of an approval to monitor digital activities performed by employees of an enterprise across multiple channels, wherein each channel of the multiple channels is associated with a different cloud-based communication product accessible to the employees;
      for each cloud-based communication product, initiate a connection with a corresponding application programming interface (API) through which to obtain data regarding digital activities performed with accounts associated with that cloud-based communication product;
      obtain data that is related to a digital activity performed with a given account associated with a given employee on a given channel, the given channel being one of the multiple channels; and
      determine a likelihood that the given account is compromised based on a comparison of the obtained data to a profile that specifies what constitutes normal behavior of the given employee with respect to each channel of the multiple channels, wherein the profile includes a separate behavior profile for each channel that is able to identify deviations in at least one of: (1) content or (2) context of digital activities performed on that channel that are representative of changes in behavior; and a memory coupled to the processor and configured to provide the processor with instructions.

14. The system of claim 13, wherein:
at least one channel of the multiple channels is associated with a collaboration suite through which the employees are able to send and receive emails; and
at least one channel of the multiple channels is associated with a communication platform through which the employees are able to send and receive messages.

15. The system of claim 13, wherein each behavior profile specifies other employees with whom the given employee normally communicates on the corresponding channel.

16. The system of claim 13, wherein the digital activity is a transmittal of a communication from the given account to another account associated with another employee, and wherein the likelihood is based on a frequency with which the given employee has communicated with the other employee via the given channel in the past.

17. The system of claim 13, wherein the digital activity is a transmittal of a communication from the given account to another account associated with another employee, and wherein the likelihood is based on whether a topic of the communication is similar to topics of past communications exchanged between the given employee and the other employee via the given channel.

18. The system of claim 13, wherein the processor is further configured to resolve an identity of the given employee based on an analysis of the data related to the digital activity.

19. The system of claim 13, wherein the obtained data is related to a sign-in event.

20. The system of claim 13, wherein the processor is further configured to identify an appropriate remediation action responsive to a determination that the given account is compromised.

21. The system of claim 20, wherein said obtaining, said determining, and said identifying are performed in real time as the digital activity is performed.

22. The system of claim 13, wherein the processor is further configured to assign an identifier that is representative of the profile to each respective given account associated with the given employee on the respective given channels.

23. The system of claim 22, wherein the identifier is a deterministic identifier that is assigned to the respective given accounts based on identifiable information included in respective first and second data.

24. The system of claim 22, wherein the identifier is a probabilistic identifier that is assigned to the respective given accounts based on signals included in first and second data that are indicative of similar behavior.

* * * * *